US010189646B2

(12) United States Patent
   Pape

(10) Patent No.: US 10,189,646 B2
(45) Date of Patent: Jan. 29, 2019

(54) METHOD AND APPARATUS FOR DISTRIBUTING ARTICLES IN A STORAGE COMPARTMENT

(71) Applicant: Reddy Ice Technology LLC, Dallas, TX (US)

(72) Inventor: Henrik Pape, Horsens (DK)

(73) Assignee: REDDY ICE TECHNOLOGY LLC, Dallas, TX (US)

( * ) Notice: Subject to any disclaimer, the term of this patent is extended or adjusted under 35 U.S.C. 154(b) by 240 days.

(21) Appl. No.: 15/201,895

(22) Filed: Jul. 5, 2016

(65) Prior Publication Data

US 2016/0311621 A1   Oct. 27, 2016

Related U.S. Application Data

(63) Continuation of application No. 12/885,240, filed on Sep. 17, 2010, now Pat. No. 9,409,726.

(51) Int. Cl.
   *B65G 17/34* (2006.01)
   *B65G 47/51* (2006.01)
   (Continued)

(52) U.S. Cl.
   CPC .............. *B65G 17/345* (2013.01); *B65B 3/06* (2013.01); *B65G 43/00* (2013.01);
   (Continued)

(58) Field of Classification Search
   CPC ...... B65G 17/345; B65G 43/08; B65G 47/32; B65G 47/34; B65G 47/42; B65G 47/46;
   (Continued)

(56) References Cited

U.S. PATENT DOCUMENTS

| 2,116,300 A | 5/1938 | Campos |
| 2,272,530 A | 2/1942 | Patterson |

(Continued)

FOREIGN PATENT DOCUMENTS

| CN | 2150499 | 12/1993 |
| EP | 0459050 | 12/1991 |

(Continued)

OTHER PUBLICATIONS

Office Action and Search Report dated Jan. 20, 2014 in related CN Patent Application No. 201180044860X, 10 pages.

(Continued)

*Primary Examiner* — Glenn F Myers
(74) *Attorney, Agent, or Firm* — Haynes and Boone LLP

(57) ABSTRACT

An apparatus and method for distributing articles made by series production is configured to deliver articles to selected storage positions in side-by-side rows of adjacent storage positions for stacked articles in a storage compartment. After selection of a storage position, a transport platform movably mounted on a horizontally movable carriage above the rows is driven to a location above the selected storage position with the platform moved between two possible positions for dispensing articles into the respective rows, an article conveyor on the platform is actuated to transport the article off the platform into the underlying storage position, where it is stacked on top of any previously stacked articles, and the platform is driven back to a start position to receive the next article. The procedure is repeated to distribute subsequent articles to selected storage positions in the storage area.

20 Claims, 18 Drawing Sheets

(51) Int. Cl.
    *B65G 69/04* (2006.01)
    *B65B 3/06* (2006.01)
    *B65G 43/00* (2006.01)
    *F25C 5/20* (2018.01)

(52) U.S. Cl.
    CPC ..... *B65G 47/5104* (2013.01); *B65G 69/0408* (2013.01); *F25C 5/20* (2018.01); *B65G 69/04* (2013.01)

(58) Field of Classification Search
    CPC .. B65G 47/50; B65G 47/503; B65G 47/5104; B65G 47/945; B65G 69/0408; B65G 69/0458; B65G 2201/0238; B65G 1/02; B65G 57/08; B65G 57/11; B65G 57/06; B65G 57/14; B65G 57/18; F25C 5/20; F25C 5/24; F25C 5/187; F25C 5/182; B65B 3/06; B65B 5/061; B65B 5/067; B65B 5/101; B65B 61/26; B65B 61/28; B65B 1/04; B65H 31/10; F25D 13/06
    See application file for complete search history.

(56) References Cited

U.S. PATENT DOCUMENTS

| | | |
|---|---|---|
| 2,232,175 A | 8/1943 | Talbot et al. |
| 2,334,256 A | 11/1943 | Eaton |
| 2,582,381 A | 1/1952 | Higginbottom |
| 2,584,726 A | 2/1952 | McOmber |
| 2,649,235 A | 6/1953 | Edmonds |
| 2,669,377 A | 2/1954 | Poolen et al. |
| 2,777,264 A | 1/1957 | Schenk |
| 2,986,897 A | 6/1961 | Howard |
| 3,034,665 A | 5/1962 | Speaker |
| 3,119,518 A | 1/1964 | Eschenburg et al. |
| 3,151,668 A | 10/1964 | Zimmerman |
| 3,211,338 A | 10/1965 | Weil et al. |
| 3,277,666 A | 10/1966 | Simmons |
| 3,323,280 A | 6/1967 | Rausch |
| 3,380,222 A | 4/1968 | Bergmann et al. |
| 3,416,620 A | 12/1968 | McClusky |
| 3,488,910 A | 1/1970 | Stoger et al. |
| 3,498,020 A | 3/1970 | Eppenberger |
| 3,501,887 A | 3/1970 | Umholtz et al. |
| 3,510,014 A | 5/1970 | Speaker |
| 3,559,424 A | 2/1971 | Nelson |
| 3,608,657 A | 9/1971 | Johnson et al. |
| 3,608,786 A | 9/1971 | Shelley et al. |
| 3,610,482 A | 10/1971 | Van Steenburgh |
| 3,618,733 A | 11/1971 | Winsett |
| 3,626,662 A | 12/1971 | Graveley |
| 3,654,771 A | 4/1972 | Kuebler |
| 3,688,471 A | 9/1972 | Clark |
| 3,698,451 A | 10/1972 | Hudson |
| 3,712,019 A | 1/1973 | Lamka |
| 3,715,119 A | 2/1973 | Shelley et al. |
| 3,719,307 A | 3/1973 | Larson |
| 3,788,566 A | 1/1974 | Morris, Jr. |
| 3,789,570 A | 2/1974 | Mullins, Jr. |
| 3,789,574 A | 2/1974 | Weikert |
| 3,807,193 A | 4/1974 | McKenney et al. |
| 3,822,866 A | 7/1974 | Daester |
| 3,830,266 A | 8/1974 | Hudson |
| 3,897,676 A | 8/1975 | Membrino |
| 3,903,674 A | 9/1975 | Brush et al. |
| 3,913,343 A | 10/1975 | Rowland et al. |
| 3,918,266 A | 11/1975 | Gindy et al. |
| 3,969,909 A | 7/1976 | Barto et al. |
| 3,974,625 A | 8/1976 | Simmons |
| 3,977,851 A | 8/1976 | Toya |
| 3,982,377 A | 9/1976 | Vanderpool |
| 4,013,199 A | 3/1977 | Brown |
| 4,027,459 A | 6/1977 | Nieskens et al. |
| 4,056,215 A | 11/1977 | Zwahien |
| 4,074,507 A | 2/1978 | Ruf et al. |
| 4,088,243 A | 5/1978 | Deveson |
| 4,129,015 A | 12/1978 | Morris, Jr. |
| 4,132,049 A | 1/1979 | Mullins, Jr. |
| 4,136,803 A | 1/1979 | Tobias et al. |
| 4,137,689 A | 2/1979 | McClusky et al. |
| 4,139,029 A | 2/1979 | Geraci |
| 4,139,126 A | 2/1979 | Krasner |
| 4,158,426 A | 6/1979 | Frohbieter |
| 4,189,063 A | 2/1980 | Matthieson |
| 4,252,002 A | 2/1981 | Mullins, Jr. |
| 4,276,751 A | 7/1981 | Saltzman et al. |
| 4,320,615 A | 3/1982 | Gmuer |
| 4,348,872 A | 9/1982 | Hill |
| 4,350,004 A | 9/1982 | Tsujmoto et al. |
| 4,368,608 A | 1/1983 | Ray |
| 4,404,817 A | 9/1983 | Cox |
| 4,409,763 A | 10/1983 | Rydeen |
| 4,413,721 A | 11/1983 | Bollier |
| 4,420,197 A | 12/1983 | Dreiling |
| 4,461,520 A | 7/1984 | Alneng |
| 4,467,622 A | 8/1984 | Takahashi et al. |
| 4,478,386 A | 10/1984 | Mikkelsen |
| 4,487,093 A | 12/1984 | Peroutky |
| 4,522,292 A | 6/1985 | Euverard |
| 4,527,401 A | 7/1985 | Nelson |
| 4,534,155 A | 8/1985 | Sawa et al. |
| 4,587,810 A | 5/1986 | Fletcher |
| 4,598,529 A | 7/1986 | Pongrass et al. |
| 4,612,779 A | 9/1986 | Hatton |
| 4,673,103 A | 6/1987 | Anderson et al. |
| 4,689,937 A | 9/1987 | Finan et al. |
| 4,715,167 A | 12/1987 | Savigny |
| 4,732,301 A | 3/1988 | Tobias |
| 4,803,847 A | 2/1989 | Koeneman et al. |
| 4,846,335 A | 7/1989 | Hartlepp |
| 4,850,202 A | 7/1989 | Kito et al. |
| 4,878,523 A | 11/1989 | Balsamico et al. |
| 4,903,494 A | 2/1990 | Wigley |
| 4,909,696 A | 2/1990 | Wigley |
| 4,930,685 A | 6/1990 | Landers |
| 4,942,979 A | 7/1990 | Linstromberg et al. |
| 4,942,983 A | 7/1990 | Bradbury |
| 4,979,353 A | 12/1990 | Seppala |
| 4,981,237 A | 1/1991 | Landers |
| 4,995,219 A | 2/1991 | Hicks |
| 5,005,341 A | 4/1991 | Tetenborg |
| 5,009,060 A | 4/1991 | Furukawa |
| 5,027,610 A | 7/1991 | Hara |
| 5,056,299 A | 10/1991 | Furukawa |
| 5,070,798 A | 12/1991 | Jurgens |
| 5,079,897 A | 1/1992 | Muller |
| 5,088,300 A | 2/1992 | Wessa |
| 5,108,590 A | 4/1992 | DiSanto |
| 5,109,651 A | 5/1992 | Stuart |
| 5,112,477 A | 5/1992 | Hamlin |
| 5,211,030 A | 5/1993 | Jameson |
| 5,277,016 A | 1/1994 | Williams et al. |
| RE34,533 E | 2/1994 | Wigley |
| 5,440,863 A | 8/1995 | Toya et al. |
| 5,473,865 A | 12/1995 | Tanaka et al. |
| 5,630,310 A | 5/1997 | Chadwell |
| 5,708,223 A * | 1/1998 | Wyss .............. G01F 23/2921 62/129 |
| 5,722,215 A | 3/1998 | Yuyama |
| 5,791,123 A | 8/1998 | Bolz |
| 5,813,196 A | 9/1998 | Page et al. |
| 5,822,955 A | 10/1998 | Woosley et al. |
| 5,832,700 A | 11/1998 | Kammler et al. |
| 6,082,827 A * | 7/2000 | McFall ............... B65G 47/967 298/17.6 |
| 6,112,539 A | 9/2000 | Colberg |
| 6,237,308 B1 | 5/2001 | Quintin et al. |
| 6,282,869 B1 | 9/2001 | Bullock et al. |
| 6,305,177 B1 | 10/2001 | Edwards et al. |
| 6,474,048 B1 | 11/2002 | Metzger et al. |
| 6,725,625 B1 | 4/2004 | Honma et al. |
| 6,862,866 B2 | 3/2005 | Jacobsen et al. |
| 6,904,765 B2 | 6/2005 | Lee et al. |

(56) References Cited

U.S. PATENT DOCUMENTS

| | | |
|---|---|---|
| 6,904,946 B2 | 6/2005 | James |
| 7,062,892 B2 | 6/2006 | Metzger |
| 7,331,163 B2 | 2/2008 | Hau et al. |
| 7,421,834 B1 | 9/2008 | Doolan |
| 7,426,812 B2 | 9/2008 | Metzger |
| 7,426,945 B2 | 9/2008 | Dalton et al. |
| 7,669,434 B2 | 2/2010 | Leclear et al. |
| 7,681,408 B2 | 3/2010 | Hobson et al. |
| 7,849,660 B2 | 12/2010 | Metzger |
| 7,958,918 B2 | 6/2011 | Ladson |
| 7,992,364 B2 | 8/2011 | Thurgood et al. |
| 8,122,689 B2 | 2/2012 | Pape |
| 8,299,656 B2 | 10/2012 | Allard et al. |
| 8,336,975 B2 | 12/2012 | Allard et al. |
| 8,353,146 B1 | 1/2013 | Bareford |
| 8,438,870 B2 | 5/2013 | Leclear et al. |
| 2002/0056607 A1 | 5/2002 | Bonnet |
| 2003/0000180 A1 | 1/2003 | Singer |
| 2004/0216481 A1 | 11/2004 | James et al. |
| 2005/0115210 A1 | 6/2005 | Noumi |
| 2006/0021300 A1 | 2/2006 | Tada et al. |
| 2006/0090427 A1 | 5/2006 | Hau et al. |
| 2007/0175235 A1 | 8/2007 | Metzger |
| 2008/0047233 A1 | 2/2008 | Metzger |
| 2008/0110129 A1 | 5/2008 | LeBlanc et al. |
| 2008/0283145 A1 | 12/2008 | Maxwell |
| 2008/0295462 A1 | 12/2008 | Metzger |
| 2010/0011710 A1 | 1/2010 | Pape |
| 2010/0024363 A1 | 2/2010 | Pape |
| 2010/0263335 A1 | 12/2010 | Pape |
| 2010/0313524 A1 | 12/2010 | Pape et al. |
| 2012/0031054 A1* | 2/2012 | Broadbent .............. B65B 5/067 53/467 |
| 2013/0255194 A1 | 10/2013 | Metzger |

FOREIGN PATENT DOCUMENTS

| | | |
|---|---|---|
| EP | 1123884 | 8/2001 |
| EP | 1696192 | 8/2006 |
| FR | 2650559 | 2/1991 |
| GB | 1459629 | 12/1976 |
| GB | 2011633 | 7/1979 |
| JP | H1-33455 | 10/1989 |
| JP | H2-41067 | 3/1990 |
| JP | 05132007 | 5/1993 |
| WO | 0001582 | 1/2000 |
| WO | 2008/089762 | 7/2008 |

OTHER PUBLICATIONS

International Search Report from PCT/DK2008/000027.
Requirement for Restriction/Election dated Dec. 20, 2013 in U.S. Appl. No. 12/885,240 (11 pages), USPTO.
Non-Final Rejection dated Oct. 21, 2015 in U.S. Appl. No. 12/885,240 (13 pages), USPTO.
Notice of Allowance dated Apr. 6, 2016 in U.S. Appl. No. 12/885,240 (8 pages), USPTO.

* cited by examiner

METHOD AND APPARATUS FOR DISTRIBUTING ARTICLES IN A STORAGE COMPARTMENT

CROSS-REFERENCE TO RELATED APPLICATION

This application is a continuation of U.S. application Ser. No. 12/885,240, filed Sep. 17, 2010, the entire disclosure of which is hereby incorporated herein by reference.

FIELD OF THE INVENTION

The present invention concerns a method for distributing articles made by series production into a storage compartment, and an apparatus for performing the method.

BACKGROUND OF THE INVENTION

Articles manufactured by series production, particularly packaged articles such as bagged candy, bagged ice cubes, and the like, are often dispensed into a storage compartment. Machines for making ice and delivering bags with loose ice cubes may be deployed in supermarkets. Such machines are designed with a top part with an ice cube machine and a central packing machine packing the ice cubes loosely in bags, and a lower part with a storage compartment from where the filled ice cube bags are supplied as the customer opens an access door to the storage compartment, providing himself with a desired number of ice cube bags. Examples of such machines are described in the applicant's patent applications WO 2008/089762 and US Pat. App. Pub. No. 2010/0024363.

One problem with such machines is that the bags fall down into the storage compartment over the same position. Over time, a stack of bags forms a pyramid. This causes the storage compartment to be badly utilized as it can only be partially filled, resulting in low capacity for a storage compartment of a given size. The pyramid of stacked bags rapidly reaches the top of the compartment, so now bags cannot be added until some are removed for purchase.

Due to the lower capacity of the storage compartment, the ice cube machine is dimensioned with a relatively high capacity in order to cope with peak loads. These may occur, for example, in connection with festivals or other events, or when the outdoor temperature rises suddenly because of change in weather.

The problem has hitherto been solved by the staff in the supermarket performing a manual leveling of the ice cube bags in the storage compartment at short intervals. This manual leveling is a problem due to work safety considerations that limit the time in which the employees are allowed to work with frozen products, and a desire to release the employees resources for other purposes in the supermarket.

The machine will also find application in connection with distribution of serially produced articles in a storage compartment where distribution of the articles in an even layer is wanted.

SUMMARY OF THE INVENTION

It is the object of the invention to provide a method and an apparatus that evenly distributes articles, in particular bags with ice cubes made in a large number, in a storage compartment, particularly in an ice cube distribution machine in a supermarket, as well as other applications involving distribution of serially produced articles in a storage compartment where distribution of the articles in an even layer is wanted.

In one embodiment, an apparatus for distributing articles into a storage compartment is provided, which comprises a storage compartment having an upper end, a lower end, opposite sides, a front and a rear, the lower end of the compartment being of predetermined dimensions for storage of first and second side by side stacked article rows, each stacked article row having a plurality of article stacking positions along its length, a horizontal conveyor located adjacent the upper end of the compartment and extending along the length of the stacked article rows, a carriage mounted on the conveyor, a first drive device carriage drive which is configured to drive the carriage back and forth along the conveyor, an article support platform movably mounted on the carriage and configured to receive articles from an article supplier above the platform, the platform having opposite ends, an article dispenser on the carriage configured to a dispense an article on the platform in a dispensing direction off at least a first end of the platform, a second or platform drive device linked to the platform for moving the platform between a first, inner position in which the first end of the platform is positioned above the first article row, whereby articles are dispensed in a first direction off the first end of the platform to drop into the first article row, and a second, outer position in which the first end of the platform is positioned above the second article row, whereby articles are dispensed off the first end of the platform to drop into the second article row.

In one embodiment, the article dispenser comprises a conveyor belt on the article support platform, each article being received on the conveyor belt in a first orientation in which one side of the article faces upwards, and the conveyor belt is actuated to convey the article off the first end of the platform so that the article turns over as it rotates off the end of the platform with an opposite side of the article facing upward when the article falls onto the stack in the selected dispensing position. This helps to position all articles in a stuck in the same orientation, for example with a label facing upwards.

In one embodiment, a control system or controller is provided for controlling operation of the first and second drive devices and the article dispenser to dispense articles into predetermined locations in the respective article rows, so that the heights of stacks of articles in each row are relatively uniform and space in the storage compartment is efficiently utilized. One or more detectors may be positioned for detecting the height of the article stacks at each stacking position in the two side-by-side article rows, and a drive control module associated with the drive devices determines the sequence for selection of the stacking position for dispensing or discharging of each article according to the following, steps:

- detecting degree of filling in each stacking position in the two side-by-side rows of stacking positions in the storage compartment;
- comparing degrees of filling;
- selecting a discharge area on the basis of the comparison, so that articles are dispensed at stacking positions having a lower degree of filling. The controller controls the carriage drive to drive the carriage to a position corresponding to lower fill stacking position in one of the rows, and controls the platform drive to move the platform into position to dispense an article into the first or second row, depending on which row has more stacking capacity at that position to receive another article. The detector may be located on the carriage or platform in order to collect information on the current degree of filling of the stacked rows of articles at each stacking position as the carriage is driven back and forth along the conveyor.

In one embodiment, a method for controlling distribution of articles into two rows of stacked articles in a storage compartment comprises selecting at least one stacking position in a storage compartment from a plurality of stacking positions in first and second side-by-side rows of article stacking positions in a storage compartment, receiving an article onto a transport platform on a conveyor assembly positioned above the stacking positions, driving the transport platform horizontally to a selected position in which the transport platform is located above the selected stacking position, and actuating an article dispenser to dispense the article from the platform into the selected stacking position in the first or second row. The method in one embodiment further comprises moving the platform between first and second dispensing positions, the first position being used for dispensing articles off a dispensing end of the platform into positions in the first row and the second position being used for dispensing articles off the dispensing end of the platform into positions in the second row. The carriage drive in one embodiment may be actuated to drive the transport platform back and forth along the entire length of the conveyor at predetermined intervals, so that a detector on the platform may collect information on the current heights of stacked articles at the stacking positions in the two rows, which is then processed by a controller in order to determine positions which have the most stacking capacity so as to select the next stacking position for receiving an article, with the objective of leveling the article stacking heights at each position. In one embodiment, the platform is rotatably mounted on the carriage for movement between a first orientation corresponding to the first position and a second orientation corresponding to the second position for dispensing articles into the first and second row, respectively.

The apparatus and method may be used in ice cube distribution machines for installation in supermarkets where the ice cubes are made in situ according to need, and are packed immediately into bags, before being distributed into a temperature controlled storage compartment under the ice cube machine.

The apparatus and method can be applied to other types of machines than ice cube distribution machines, were a large number of articles are produced centrally above a storage compartment in which the articles are to be evenly distributed in order to utilize the capacity of the storage compartment. Examples of such applications could be in connection with a plastic injection molding machine where a large number of articles are produced centrally, or in connection with packing and supplying other types of foods, e.g. vegetables or confectionery.

In connection with systems where one or more users take articles from the storage compartment, the degree of filling at the stacking positions may be different due to the fact that the articles are taken from the stacking positions at different rates. By actively detecting the degree of filling in the individual stacking positions and adapting the sequence of selecting stacking positions on the basis of a comparison of the degrees of filling in each stacking position, a leveling that takes account of user interaction may be achieved. The capability of stacking bags in two side-by-side tows further increases the storage capacity.

In a particularly simple way there is hereby achieved the ability of dispensing articles from an overhead conveyor into selected stacking positions in two side-by-side rows of stacking positions.

DESCRIPTION OF THE DRAWING

The invention will be explained in more detail below with reference to the accompanying drawings, where.

In the explanation of the Figures, identical or corresponding elements will be provided with the same designations in different Figures. Therefore, no explanation of all details will be given in connection with each single Figure/embodiment.

DETAILED DESCRIPTION

Certain embodiments as disclosed herein provide a method and apparatus for distributing articles from an article production machine into predetermined article stacking positions in an article storage area from which consumers can retrieve one or inure articles. In one embodiment, the article production machine is an ice making, bagging and dispensing machine and the storage area is in a freezer compartment beneath the ice making and bagging units of the machines with a bagged ice distributing apparatus positioned in the freezer compartment to receive bags of ice successively from the ice bagging unit and to discharge or distribute the bags at selected locations in the compartment so as to achieve a relatively even distribution of stacked bags of ice throughout the compartment.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

In the illustrated embodiment described below, the article distribution apparatus is used to transport ice in bags to selected positions above a storage area in a freezer or temperature controlled compartment, and to discharge or distribute the bags into stacks in the storage area. However, it will be understood that the same distribution apparatus may be used in ether applications, for example in any serial production application where a large number of articles are produced centrally above a storage compartment in which the articles are to be evenly distributed in order to utilize the capacity of the storage compartment. Examples of such applications could be in connection with a plastic injection molding machine where a large number of articles are produced centrally, or in connection with packing and supplying other types of foods in bags or other containers, e.g. vegetables or confectionery.

Figure 1:
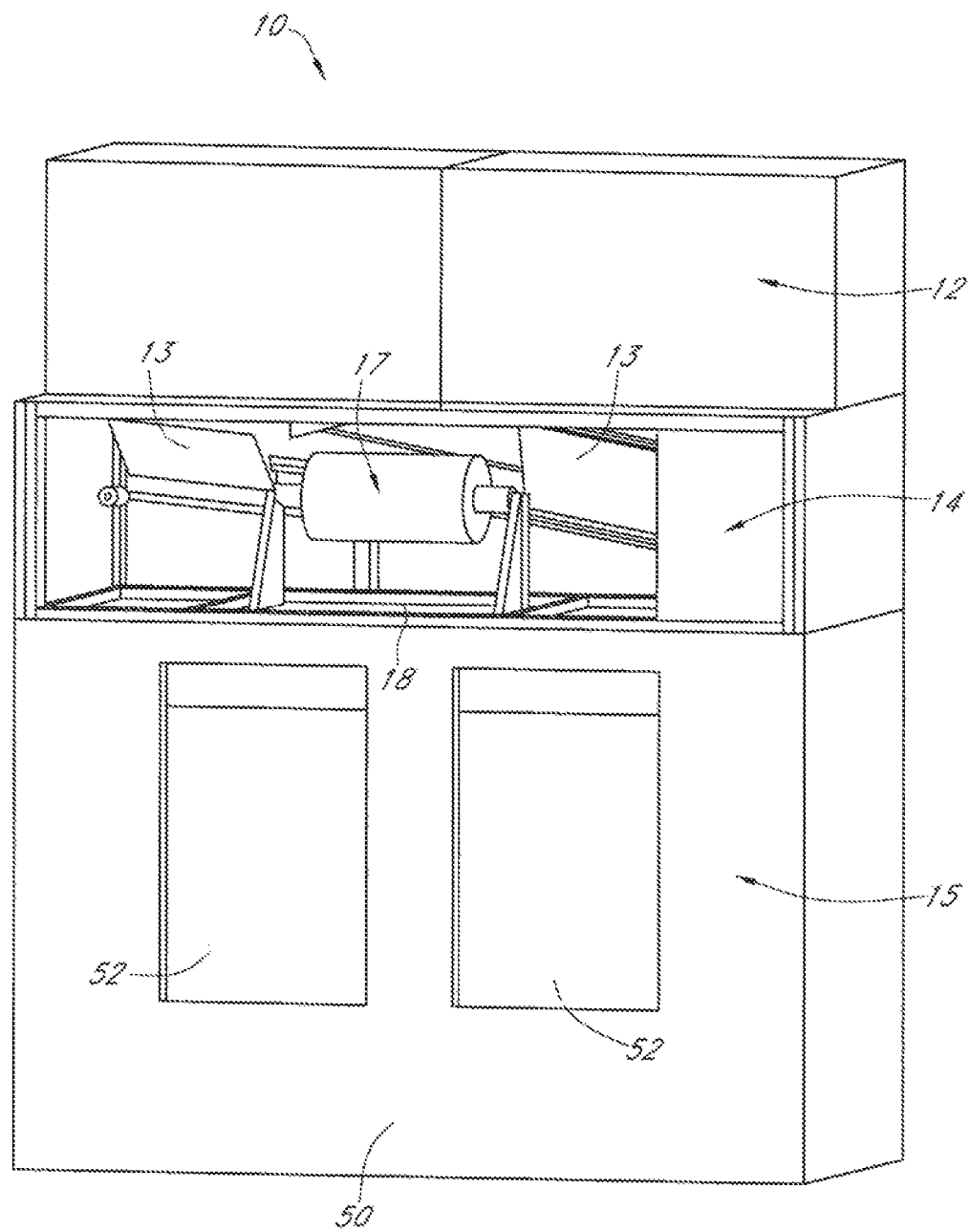
FIG. 1 is a front perspective view of one embodiment of an ice making, bagging and distributing machine.

FIG. 1 illustrates one embodiment of a bagged ice dispensing machine 10 which has an upper, ice making unit 12, an ice collecting and bagging unit 14, and a freezer storage compartment or merchandiser 15 beneath the ice collecting and bagging unit. The ice collecting and bagging unit 14 may be the same as described in co-pending patent application Ser. No. 12/580,146 filed on Oct. 15, 2009, the entire contents of which are incorporated by reference herein. One or more ice making machines (not illustrated) are located in the ice making unit or housing 12, and dispense ice in cubes or pieces into ice collectors 13 which direct the ice in a transport path towards a bag making station 17, where the ice is collected into partially formed bags which are then sealed. Sealed bags 16 are dropped through an opening 18 into the storage compartment, as described in more detail below. The bagged ice distribution apparatus described herein replaces the bag distributor unit described in the prior application, and is mounted in an upper part of the compartment 15 in a suitable position to collect bags of ice dispensed from the ice collecting and bagging unit 14, as illustrated in the drawings.

Figure 2:
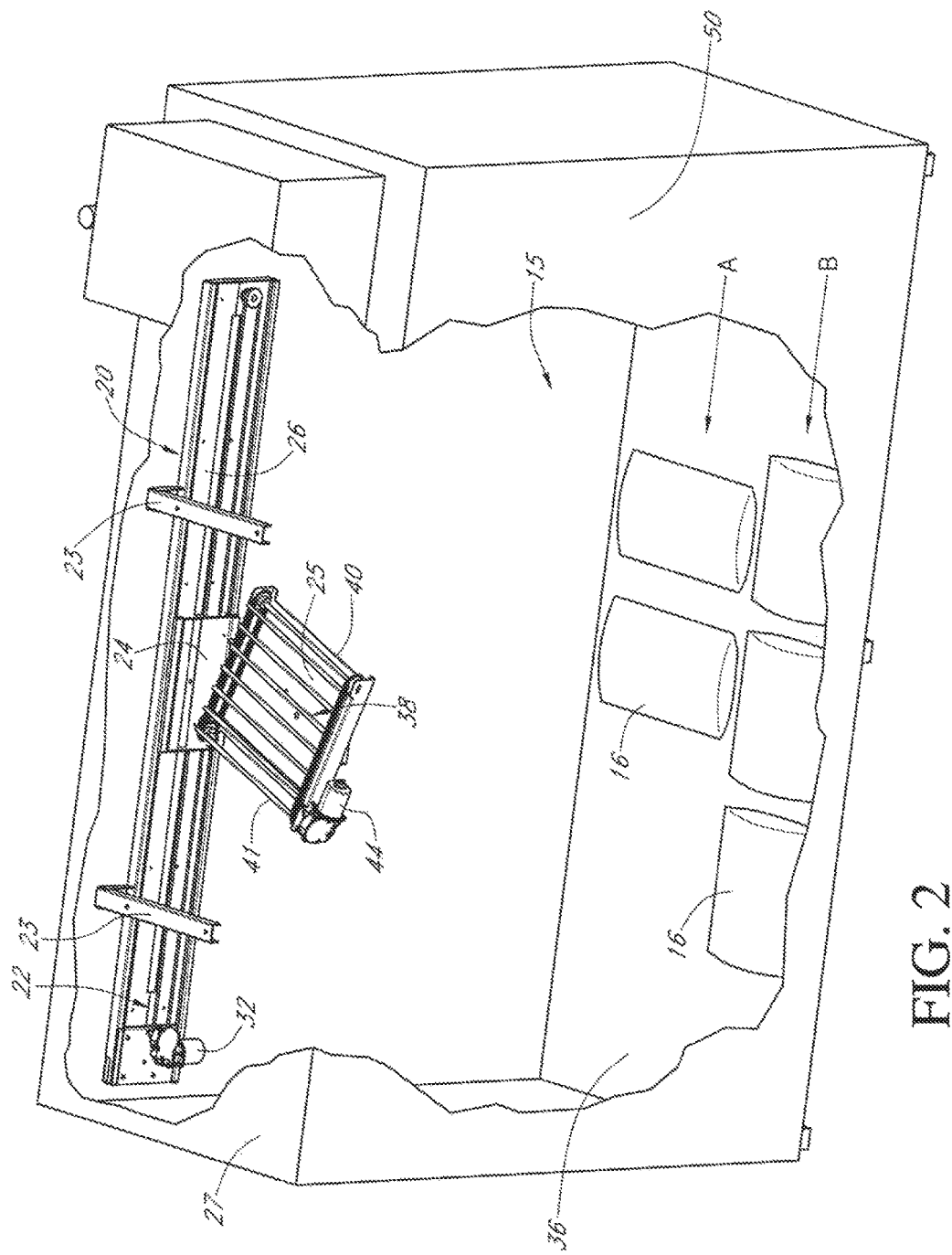
FIG. 2 is a perspective view of the bagged ice freezer and storage compartment of the machine of FIG. 1, with the front wall removed to reveal one embodiment of an article distributing apparatus mounted in an upper portion of the storage compartment.
Figure 3:
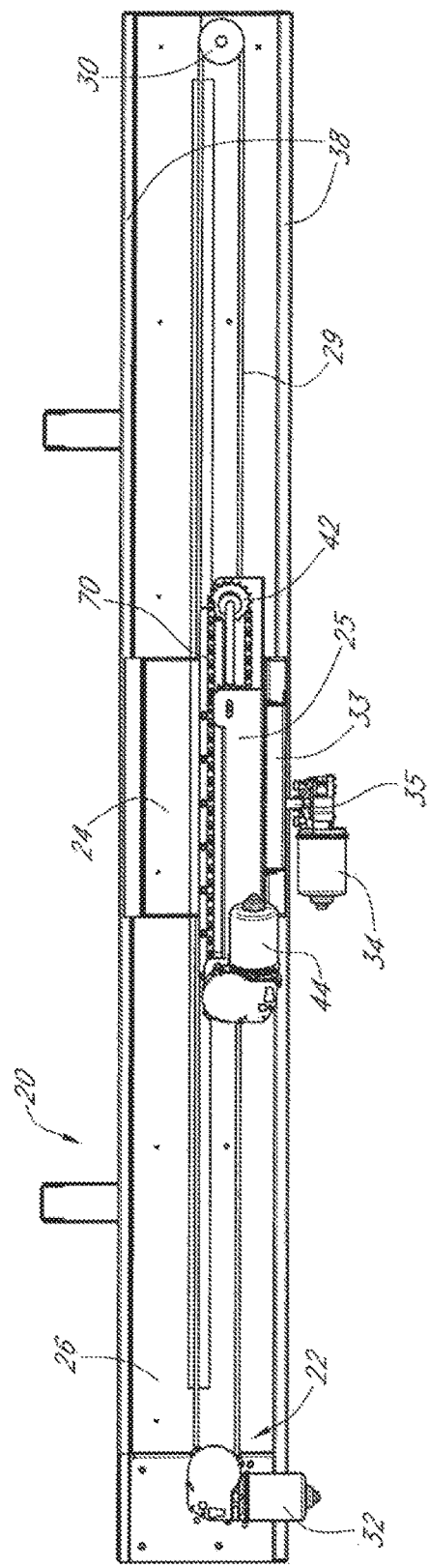
FIG. 3 is a front elevation view of the distributing apparatus of FIG. 2.
Figure 9:
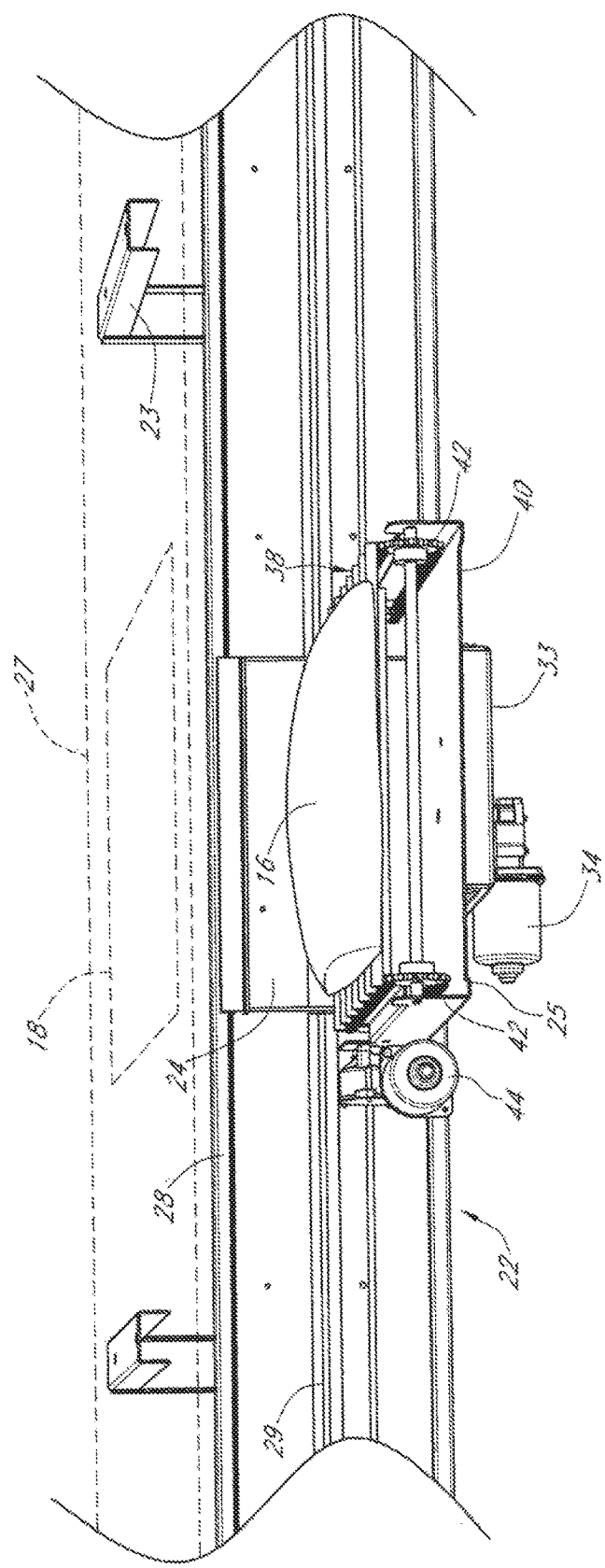
FIG. 9 is a front elevation showing part of the distributing apparatus in a receiving position under an opening in a dividing wall between the ice making and bagging units of the machine and the storage compartment, with a bag received on the bag supporting and distributing platform and the platform in the first discharge position of FIG. 5A.

FIGS. 2 to 10 illustrate one embodiment of an article distributing apparatus or unit 20 suitable for distributing bagged ice or other serially manufactured articles to desired stacking locations in a storage compartment such as compartment 15 of FIGS. 1 and 2. In the illustrated embodiment, compartment 15 is also a merchandiser or dispenser from which customers can retrieve articles such as bags of ice for purchase. A dividing wall 27 is provided between the ice collecting and bagging unit 14 and the storage or freezer compartment 15. The apparatus 20 is mounted in an upper portion of the storage compartment beneath an opening 18 through which articles such as bags 16 of ice are distributed onto the apparatus, as best illustrated in FIG. 9, and above a storage area in the compartment. As illustrated in FIGS. 2 to 10, apparatus 20 basically comprises a horizontal conveyor 22, a carriage 24 mounted on the conveyor and movable back and forth in a horizontal direction on the conveyor, and a bag or article support platform or turntable 25 rotatably mounted on carriage 24 for rotation between two or more possible orientations for distributing bags into the storage area, as described in more detail below.

Figure 4:
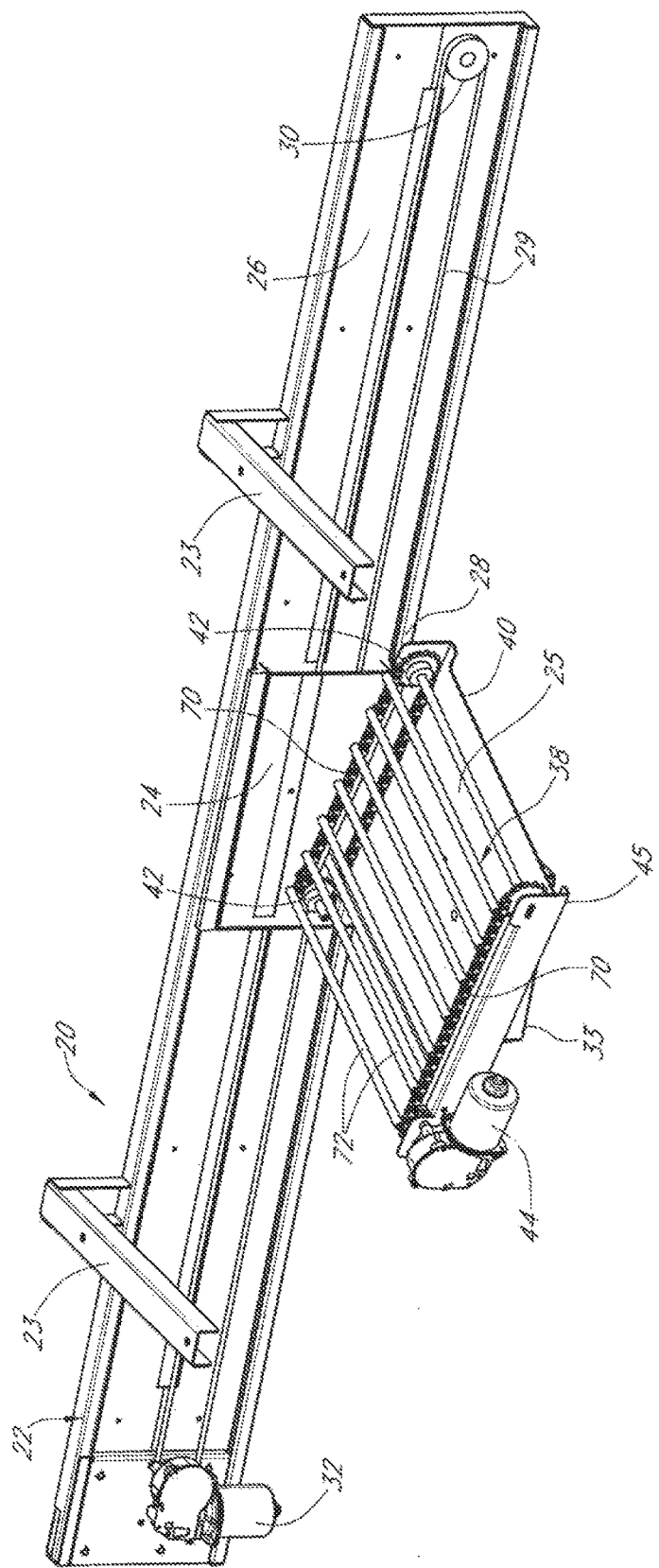
FIG. 4 is a perspective view of the distributing apparatus of FIG. 3.
Figure 5A:
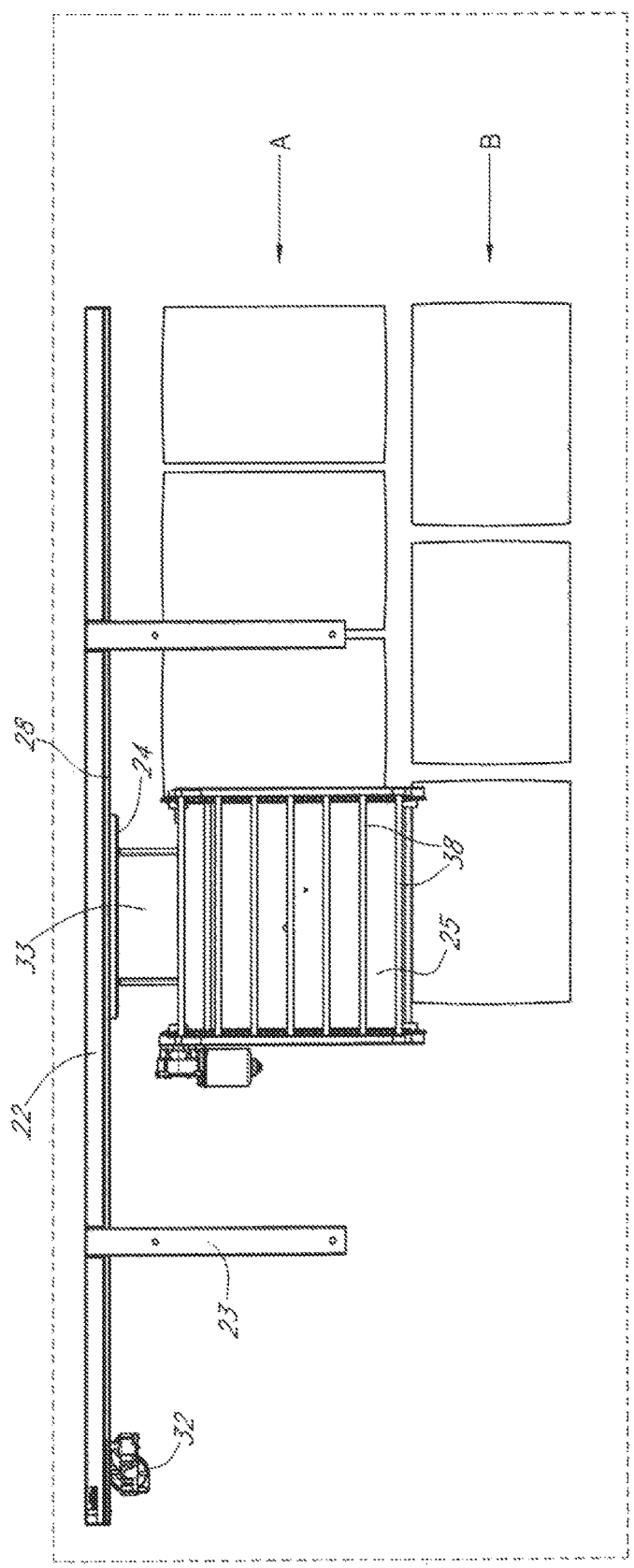
FIG. 5A is a top plan view of the distributing apparatus with the article or bag support platform in a first transport and discharge position on the carriage for distributing bags into a first row of bag stacking positions in the storage area.
Figure 5B:
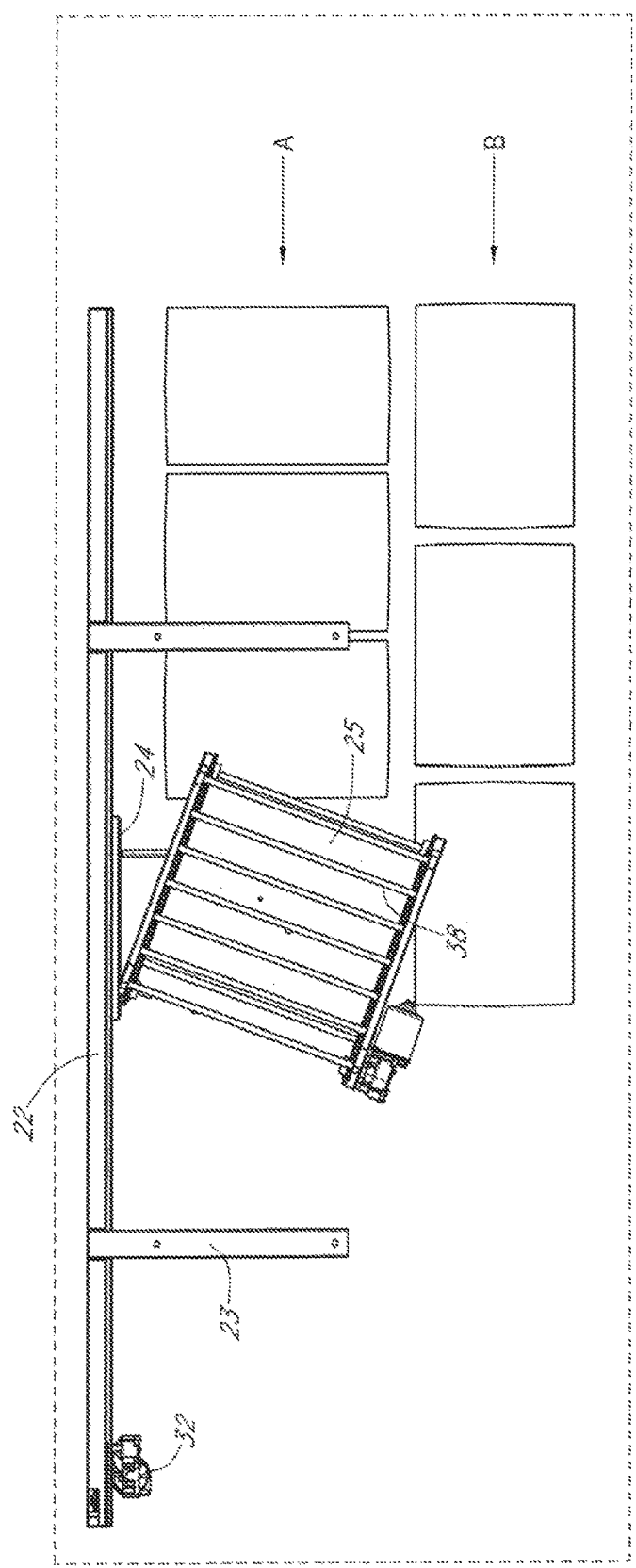
FIG. 5B is a top plan view similar to FIG. 5A illustrating rotation of the support platform from the first position of FIG. 5A towards a second discharge position.
Figure 5C:
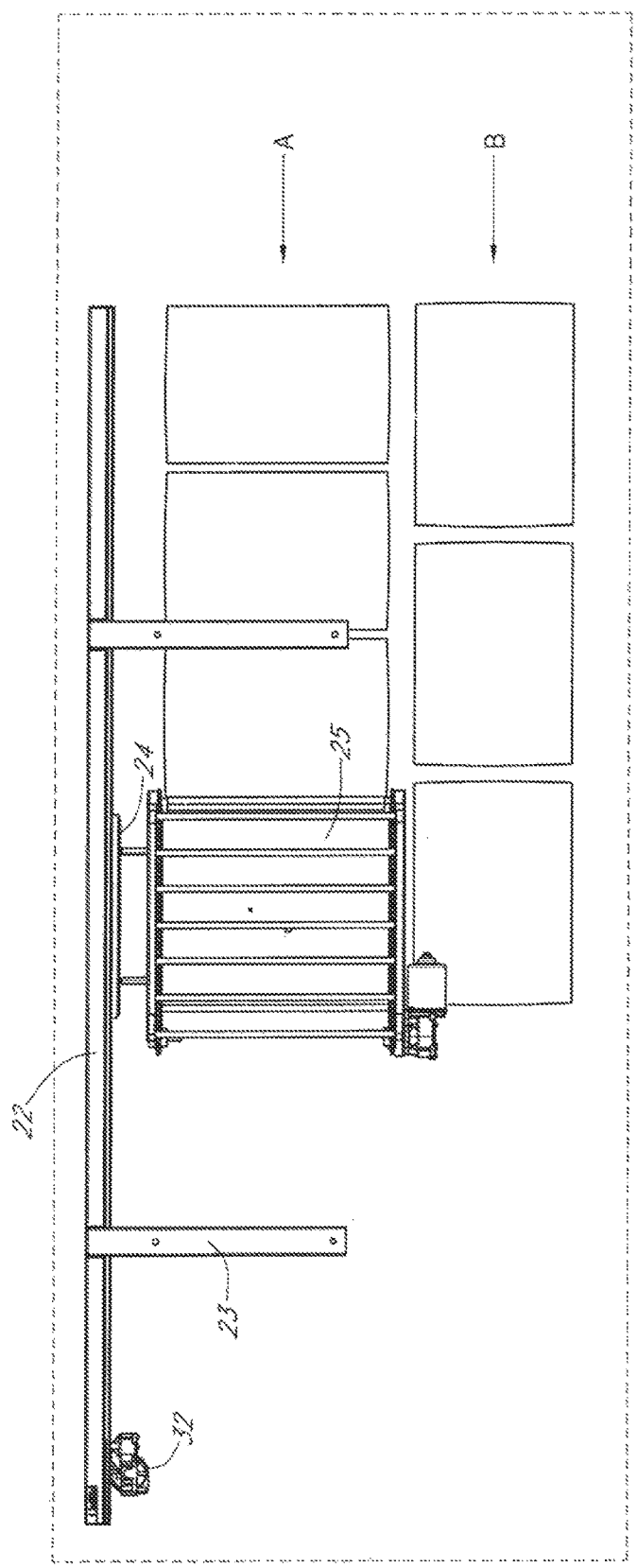
FIG. 5C is a top plan view similar to FIGS. 5A and 5B but illustrating the support platform rotated into a second discharge position for distributing bags into a second row of bag stacking positions in the storage area.
Figure 6:
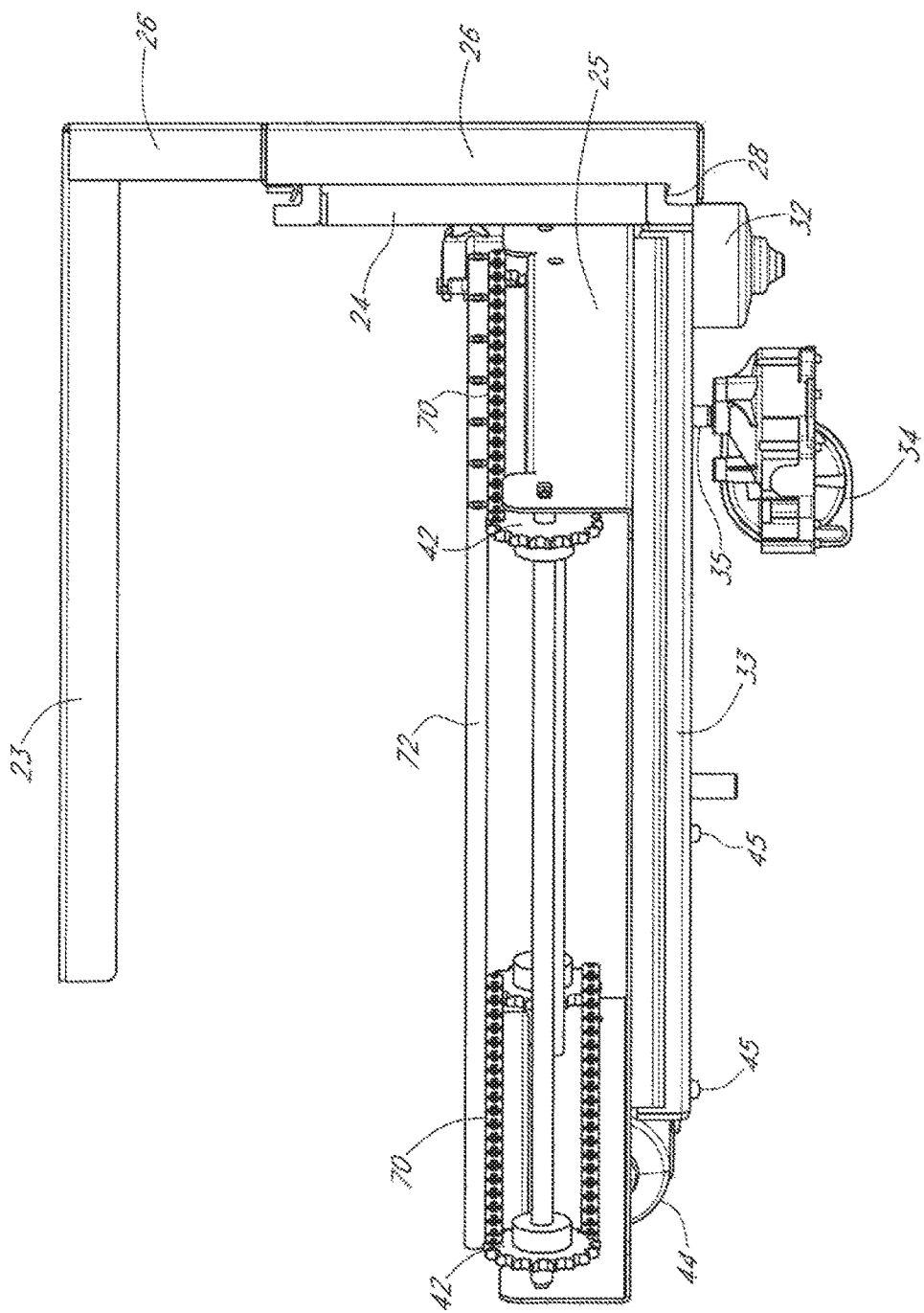
FIG. 6 is a side view of the distributing apparatus of FIGS. 3 to 5.
Figure 7:
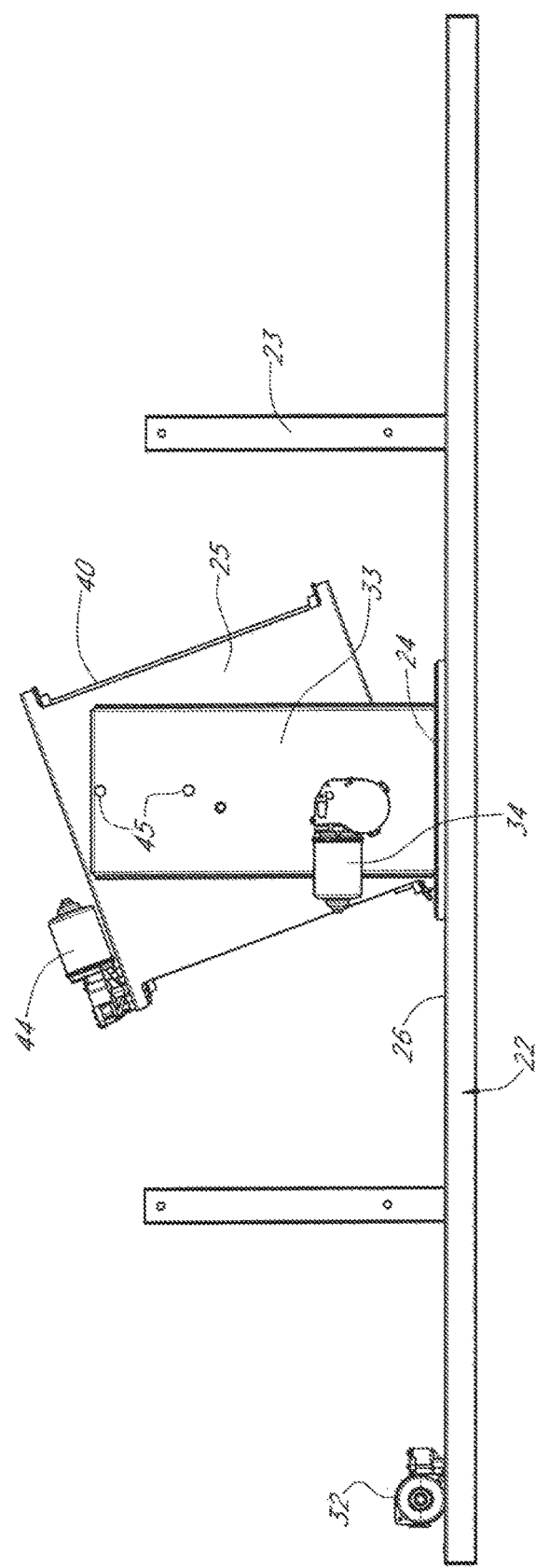
FIG. 7 is a bottom plan view of the distributing apparatus of FIGS. 3 to 6.
Figure 8:
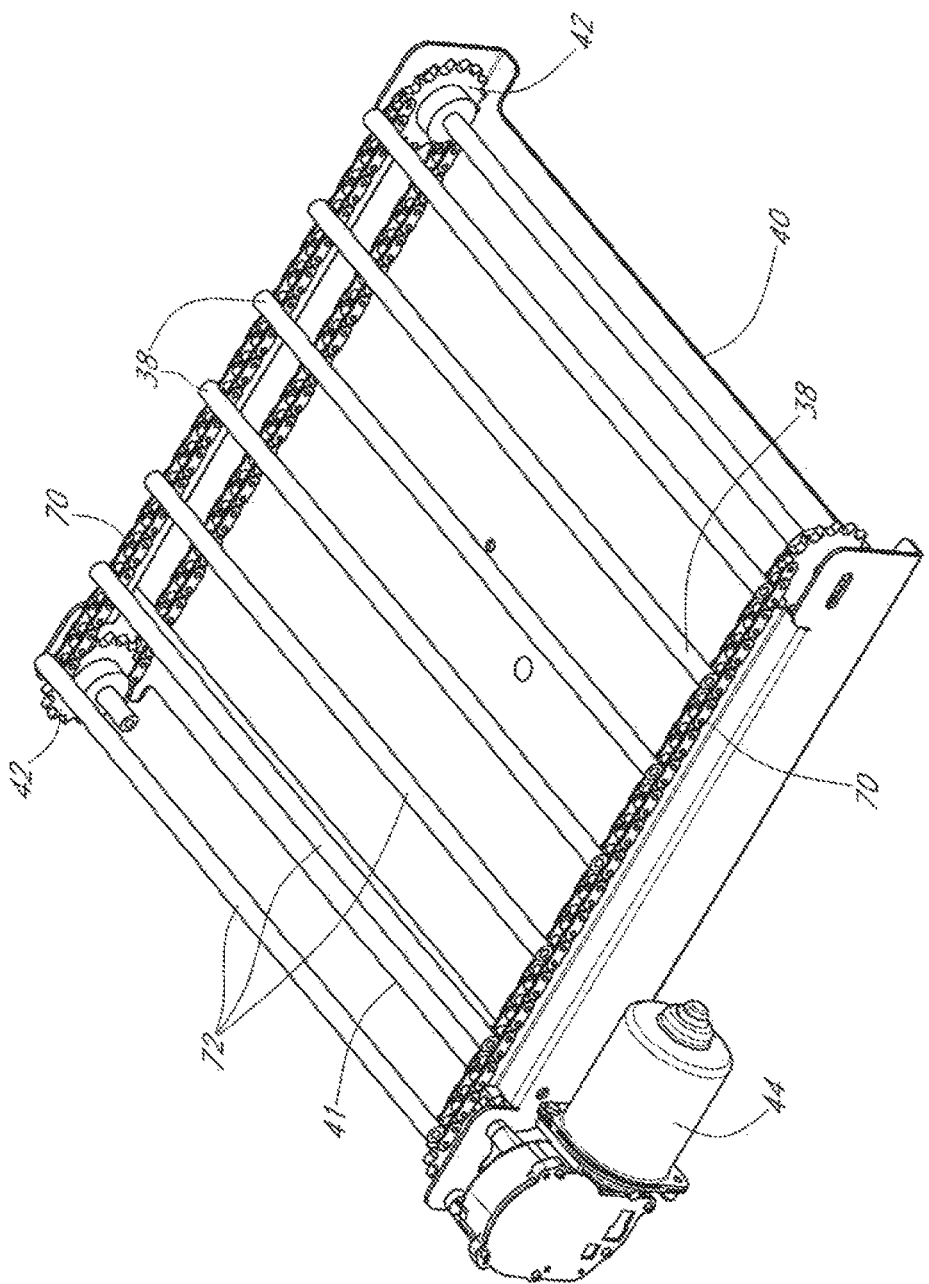
FIG. 8 is a perspective view of the support platform of the distributing apparatus of FIGS. 3 to 7.

The horizontal conveyor 22 comprises a back plate or mounting plate 26 having a rail or track 28 on which the carriage 24 is slidably mounted (see FIG. 6), an endless conveyor belt or chain 29 extending around rollers 30 at opposite ends of the track, with the carriage 24 suitably linked to the chain in a known manner, and a conveyor drive or gear motor 32 mounted at one end of back plate 26. Motor 32 drives one of the rollers 30 which acts as a drive roller for the conveyor belt. As illustrated in FIGS. 2 and 4, mounting brackets 23 are secured to the top of back plate 26 for securing the distributing apparatus 20 to an upper wall 27 of storage compartment 15. Article or bag support platform 25 is rotatably mounted on a horizontal extension or support arm 33 of carriage or turntable 24 via pivot connection 35, as best illustrated in FIGS. 3 to 7. Platform 25 is rotated by platform drive or gear motor 34 between a first orientation as illustrated in FIG. 5A in which it times outwardly from track or rail 24 for distributing bags into an outer row B of adjacent bag stacking positions B1, B2, B3 . . . BN in the base or lower wall 36 of storage compartment 15 (see FIGS. 2, 5 and 10), and a second orientation as illustrated in FIG. 5C in which it faces in a direction parallel with rail 24 for distributing bags into an inner row A of adjacent bag stacking positions A1, A2, A3 . . . AN. FIG. 5B illustrates a partial rotation of the platform 25 between the first and second orientations of FIGS. 5A and 5C.

An article conveyor or conveyor belt 38 is mounted on platform 25 for conveying bags or other articles selectively off first or second ends 40, 41 of the platform and into the inner or outer row A, B of stacked bags, depending on the orientation of the platform when the conveyor 38 is activated. Conveyor 38 extends around guide rollers or wheels 42 at opposite ends of platform 25 and is driven by bag or discharge conveyor drive or gear motor 44 which rotates one of the rear rollers 42. In the illustrated embodiment, the article conveyor 38 comprises a pair of endless chains 70 each extending around a respective pair of rollers 42 at the front and rear end of the platform and a plurality of transverse cross bars 72 extending between the chains, but alternative conveyors such as an endless conveyor belt or band on which a bag is carried may be provided in alternative embodiments. In other alternative embodiments, the article conveyor may be a pusher device or the like rather than a conveyor belt on which the article is carried.

Opposite ends 40, 41 of the bag conveyor 38 are rounded, as illustrated in FIGS. 8 to 10 and 13D to 13F, which tends to overturn bags of ice as they are dropped off the conveyor, as described in more detail below. A pair of detectors 45 are mounted on the lower face of arm 33 which supports platform 28 to detect the height of stacked bags in the two storage rows, as described in more detail below. Additional detectors (not illustrated) may be located at different positions on the platform. Other detectors may be associated with each of the conveyors and the drive devices to provide input to a controller so that the carriage and platform can be moved to the desired positions based on programming of the controller and input from the various detectors, as discussed in more detail below. Alternatively, stationary detectors on the lower face of wall 27 may be positioned to detect bag height in each of the bag receiving positions in each row.

As described in patent application Ser. No. 12/580,146 referenced above, a partially formed bag at bag forming and filling station in the unit 14 is filled with ice until a predetermined weight is reached. During filling, the lower end of the bag is suspended through the opening 18 between units 14 and 15 above distribution apparatus 20 so that the ice is within the freezer compartment, to reduce melting. At the start of a bag distribution procedure, the platform 25 is located in a start position beneath opening 18. When the desired weight of ice in bag 16 is reached, more film is fed to the bag forming and filling station and the partially filled bag is lowered onto bag receiving platform 25 of the distribution apparatus 20 until its lower end rests on the conveyor 38. The platform conveyor drive 44 is then actuated to drive the conveyor 38 rearward until the film is stretched. The sealing bar (not illustrated) in the bag forming and filling station is then closed. The conveyor drive 44 is actuated to drive the conveyor 38 forward to take the tension of the film before sealing. The sealing bar is then actuated to form a seal across the top of the bag and a cut is made to detach the bag from the next bag length of film material, as described in patent application Ser. No. 12/580,146 referenced above. The bag then falls onto the conveyor into the position illustrated in FIG. 9. The conveyor drive 44 is again actuated to drive the conveyor rearward, overturning the filled bag and placing it in a horizontal position, as illustrated in FIG. 9. Operation of the components of unit 14 and unit 20 during positioning of a bag on the platform prior to distribution into the compartment 12 are controlled and coordinated by ice making and bagging controller 102 and bag distribution controller 100 (see FIG. 12). The ice making and bagging controller 102 is described in application Ser. No. 12/580,146 referenced above and incorporated herein by reference, and reference is made to that application for a detailed description of controller 102.

Figure 11:
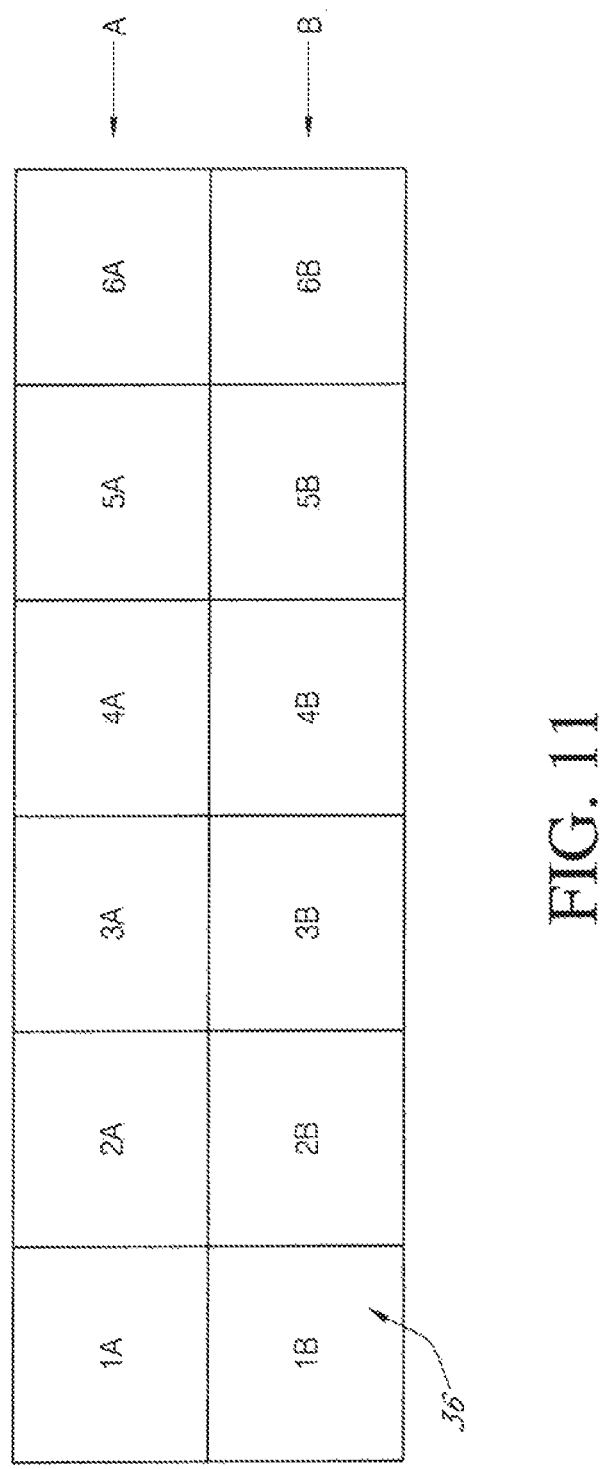
FIG. 11 is a top plan view of the storage area in the base of the storage compartment of FIG. 2, illustrating the rows of stacked bag storage positions.
Figure 12:
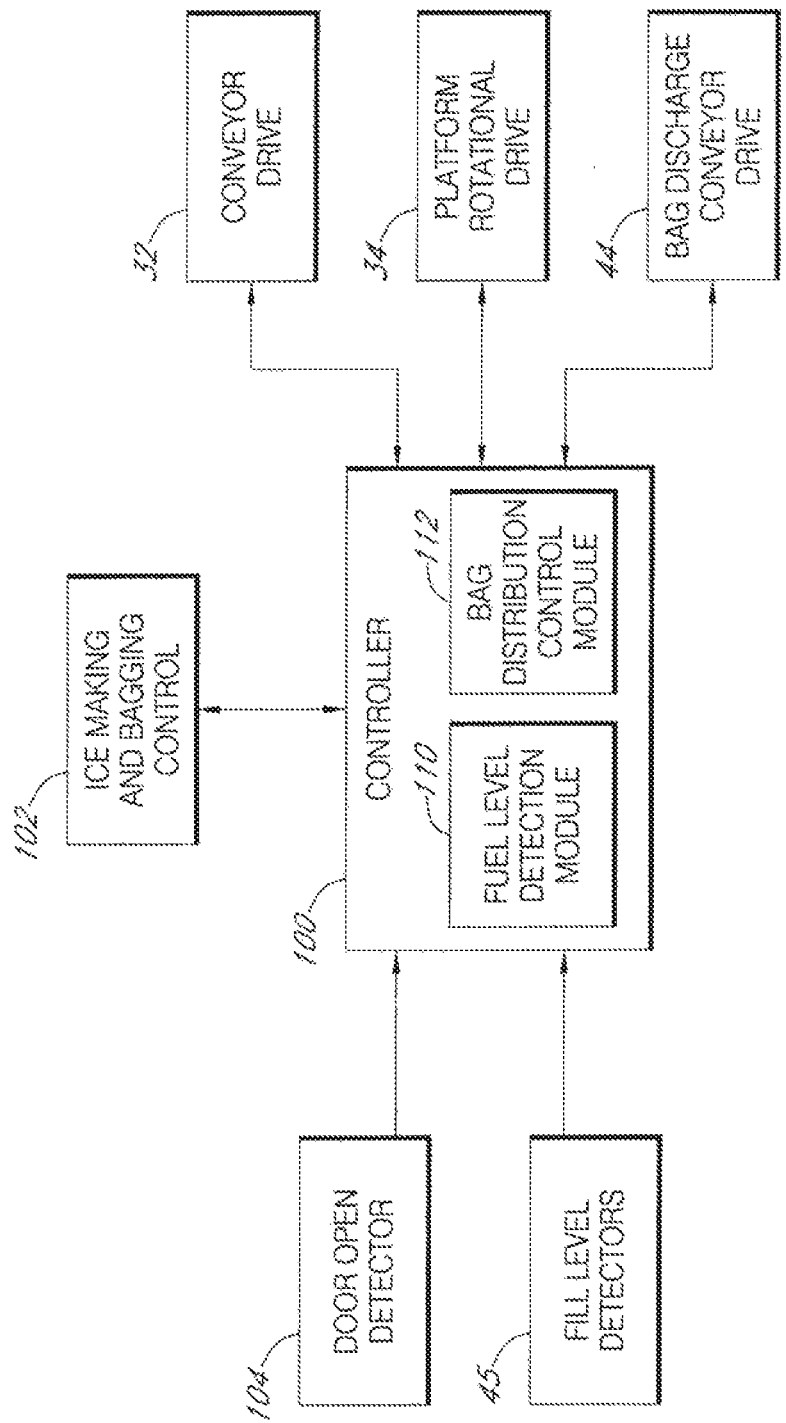
FIG. 12 is a block diagram illustrating one embodiment of a control system for controlling operation of the bag distributing apparatus of FIGS. 2 to 10

The storage compartment 15 in the illustrated embodiment has two side-by-side rows A, B of bag storage positions A1, A2, A3 . . . , etc. and B1, B2, B3, . . . , etc, in the base of the compartment, as illustrated in FIG. 11. A greater or lesser number of storage positions and storage rows may be provided in alternative embodiments, depending on the dimensions of the storage compartment. FIG. 12 illustrates a control system which controls the sequence of bag dropping into the storage positions so as to maintain the height of stacked bags at each storage position approximately level. Controller 100 has a fill level detection module 110 which is programmed to periodically monitor the height of stacked bags at each storage position based on input from detectors 45 as the platform 25 is driven back and forth along the inner and outer rows, and to calculate the positions with the lowest fill level, and a distribution control module 112 which controls the horizontal conveyor drive 32, the platform rotational drive 34, and the platform conveyor drive 44 to drive the platform to a selected drop or discharge position above a storage position selected based on the current fill level information from module 110. Detector information for use in selection of the next discharge position may be gathered both as the platform is being driven to a currently selected bag discharge position, and in periodic detection sequences in which the platform is driven along the entire length of each row while empty. The objective is leveling of the multiple bag stacks. Different storage positions may have an order of preference such that when different storage positions have about the same fill level or are empty, the controller selects a discharge position using the order of preference.

The front wall 50 of the compartment has doors 52 for access by customers to the interior of the compartment in order to retrieve one or more bags of ice for purchase. Door opening detectors 104 (FIG. 12) may be associated with the doors for detecting opening of the doors, as described in co-pending patent application Ser. No. 12/580,146 referenced above. The controller 100 also monitors the number of times a door is opened and may initiate a fill level detection sequence if the bag is opened more than a predetermined number of times within a certain time period, and may also provide a control signal to ice making and bagging controller 102 increase the speed of the ice making, bag making and bag filling procedure in times of increased purchase of bagged ice, for example during holiday seasons and in hot weather. Controllers 100 and 102 are also configured to switch off the ice making, collecting and bagging as well as the distribution apparatus 20 while a door is open, since bags should not be dropped into the compartment 15 while a customer is retrieving one or more bags of ice, as well as when the storage compartment is full to capacity at each bag stacking position.

In one embodiment, each detector 45 may be a proximity or distance detector such as an infra red (IR) sensor, a photoelectric sensor, or the like which detects the height of successive stacks of bags in each of the rows and provides the height or fill level information to the controller 100, which stores the information and also determines a current bag drop sequence based on the fill level information. The detector may simply detect whether or not a stack of bags is at the maximum available height (i.e. the storage position is full), or may determine distance to the top of a stack, so that the controller or processor 100 can determine if a storage position is completely empty, as well as the approximate bag stack height or amount of fill of the stack. The latter is preferred since the controller may then be programmed to control the distributing apparatus 20 to maintain the stacks as level as possible, i.e. dropping bags at selected locations to keep the stack heights relatively even. The sensors on the platform support arm 33 are positioned so that stack heights at aligned positions in both rows may be determined simultaneously.

The sensing sequence for detectors 45 with the arrangement of bag drop positions in FIG. 11 is six sensor outputs corresponding to the bag drop positions 1 to 6, with two outputs at each sensor output position, i.e. a total of twelve sensor outputs. The lowest points detected are stored and sent to controller 100 for determining the bag delivery o distribution sequence. The bag delivery sequence is controlled to drop bags at the lowest detected positions from the previous sensing sequence. Sensing may be performed during bag distribution on wherever a predetermined number of door openings is detected. In one embodiment, an initial fill sequence for a completely empty storage compartment may be A1, A2, A3 . . . AN, followed by B1, B2, B3 . . . , BN, referring to FIG. 11, where N is the total number of bag stacking positions in each row. In alternative embodiments, other initial sequences may be used, such as A1, B1, A2, B2 . . . and so on, or A1 . . . AN, BN . . . B1. A first bag is deposited at a first bag stacking position in the selected sequence, then a second bag at the second position, and so on until bags are removed by customers or each position is stacked with bags to the maximum height, i.e. the compartment is 100% full. If the compartment is completely full, the ice making and bagging unit 14 and distributor apparatus or unit 20 may be turned off until bags have been removed and re-filling is required. Unit 14 and the bag distributing unit or apparatus 20 are also turned off when a door open detection signal is received, so that bags are not dropped into the freezer compartment when a customer is attempting to remove one or more bags of ice for purchase.

As noted above, the degree of filling of the individual bag storage or stacking positions is detected by one or more detectors when a bag is being carried to a drop position or when a scan is made with the platform 25 empty, or both, as described above. If there are any low stacking positions, the re-fill sequence may follow the same basic preference or order as described above. For example, say positions A3, A6, B1 and B4 are detected to be empty or partially empty, or lower than other stacking positions and if they are all at the same fill capacity, the fill sequence may be A3, A6, B1, B4, A3, A6, B1, B4, and so on until each position is completely filled, unless other positions are detected to be completely or partially emptied in the meantime, in which case the other positions are simply added to the sequence. The lowest detected position receives bags before any other position.

Figure 14:
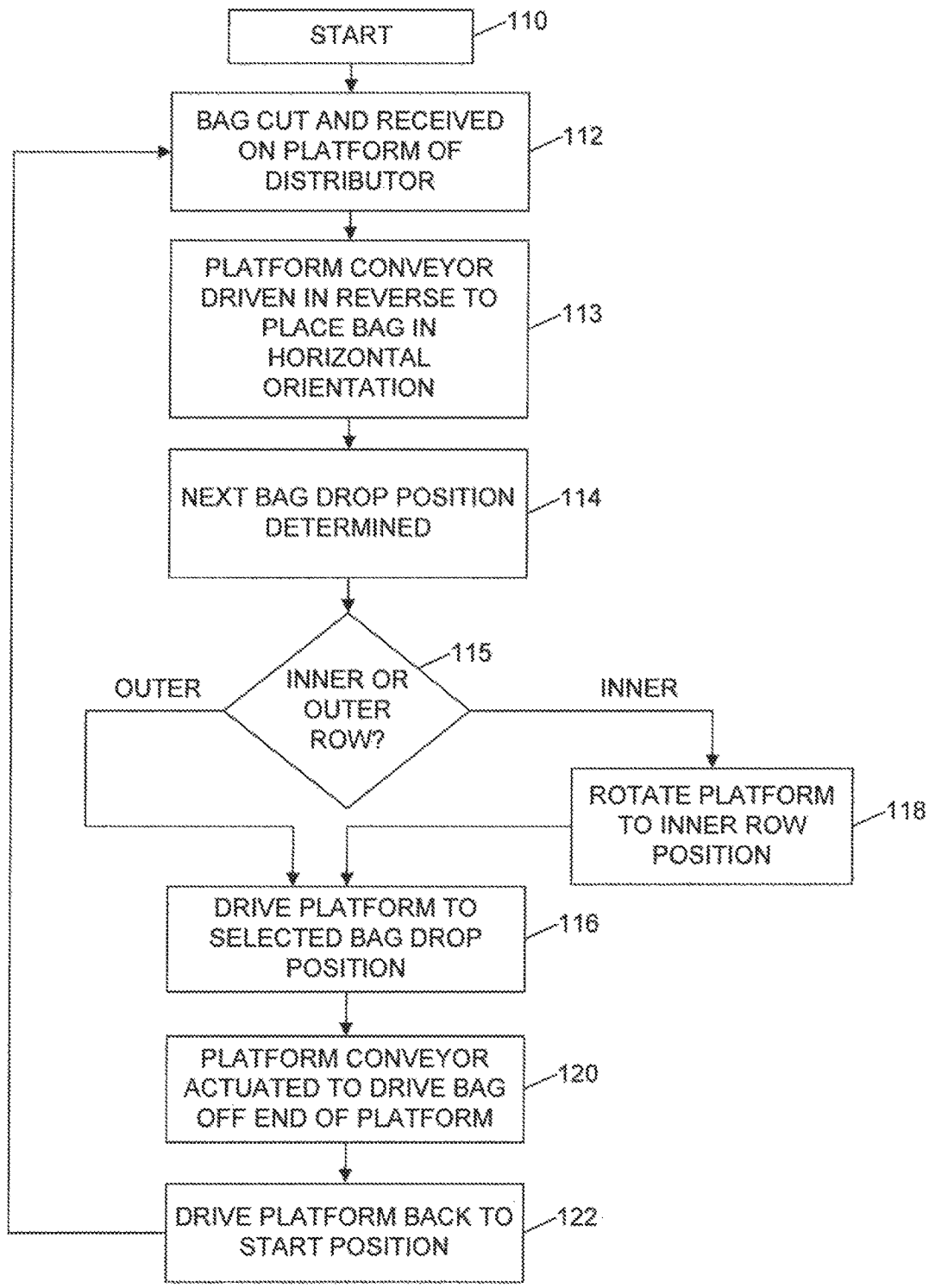
FIG. 14 is a flow diagram illustrating a method of operating the bag distributing apparatus of FIGS. 1 to 13.
Figure 15:
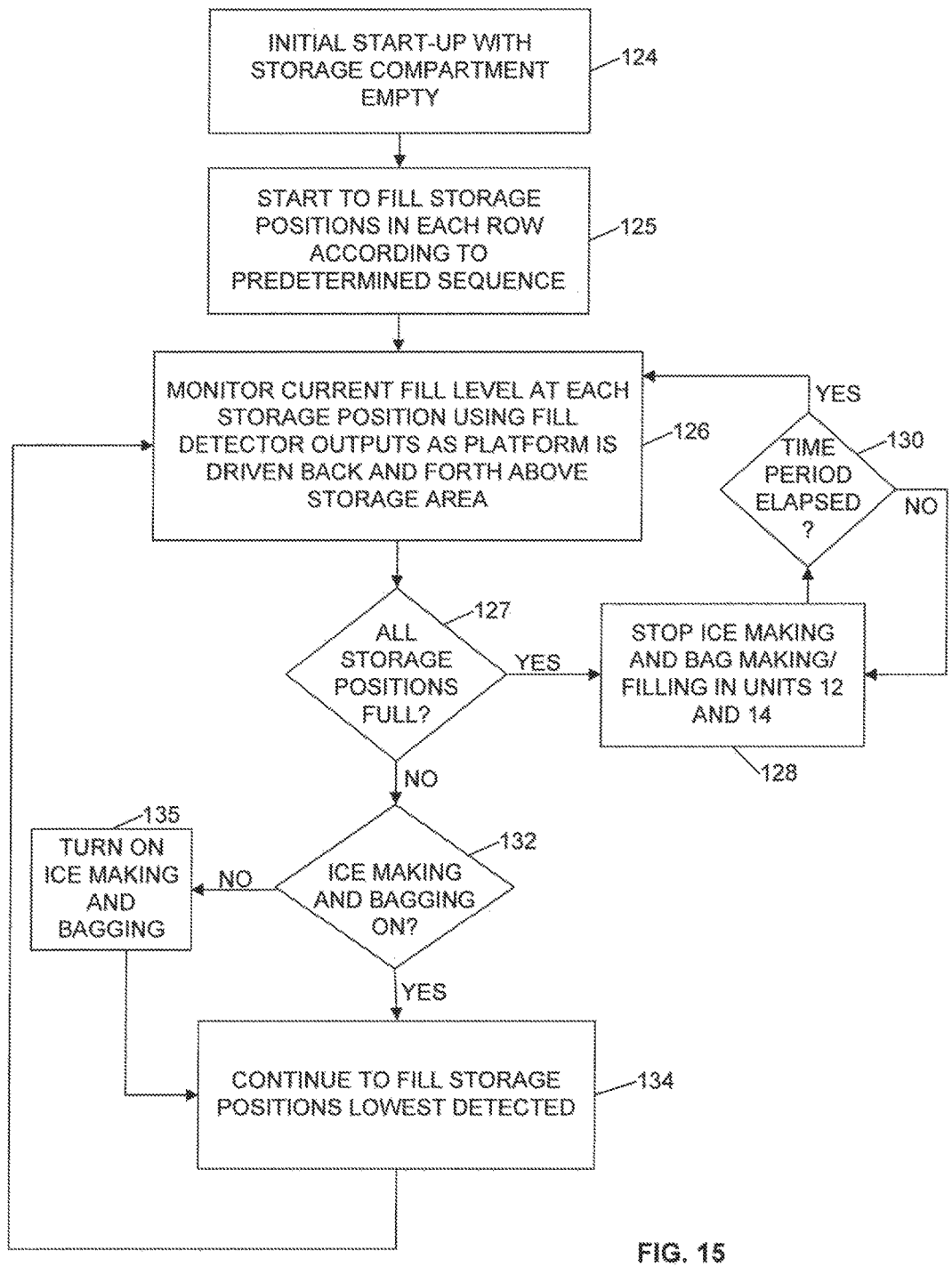
FIG. 15 is a flow diagram illustrating a method of selecting a bag drop position for each bag received onto the distributing apparatus.

One embodiment of a bag transport and discharge method using the apparatus of FIGS. 1 to 12 is illustrated in the flow diagram of FIG. 14. On start up of the machine 10 (step 110), ice making and bagging is controlled by the controller 102 of unit 14, while bag distribution controller 100 of FIG. 12 controls bag transport and distributing unit 20. FIG. 9 illustrates a bag 16 which has just dropped down onto the bag transport platform 25 which is positioned in a start position immediately under an opening 18 in wall 27 between ice making and bagging unit 14 and storage compartment 15. The opening 18 is located under the bag forming and filling station of the ice making and bagging unit so that a filled bag extends through the opening before the upper end of the bag is sealed and cut. As described above, the lower end of the bag may rest on the platform 25 during the sealing and cutting procedure, with the platform conveyor driven forward and rearward to take up slack in the film forming the bag. Once sealing and cutting is complete, the bag of ice drops down onto the platform 25 (step 112). A suitable detector (not illustrated) may be located on the platform to detect when a bag is received on the platform, or a signal from the bag forming and filling station may be sent to controller 100 each time a bag is sealed and cut off. The platform conveyor drive is then driven in reverse a short distance (i.e. from the first to the second end of the platform) so as to place the bag in a horizontal orientation on the platform (step 113). The bag is illustrated in the horizontal position in FIGS. 9 and 10. The next storage position for dropping or discharging the bag from platform 25 is then selected using information from the detector sensing sequence (step 114). One possible method for selecting a sequence of bag drop positions is illustrated in FIG. 15 and described in more detail below. Once a drop position has been selected, the controller determines whether the selected position is in the inner or outer row (step 115).

The flow diagram of FIG. 14 assumes that the platform is in an outer facing position of FIG. 5A when the bag is dropped onto the platform, as in FIG. 9. However, it may alternatively be positioned in the orientation of FIGS. 5C and 10 at the start of the procedure of FIG. 14. At step 115, if the platform is already in the orientation of FIG. 5A ready to drop bags into the outer row B, and the selected bag drop position is in row B, the platform is driven to the selected bag drop position in step 116. If the platform is in the orientation of FIG. 5A but the selected bag drop position is in the inner row A, the platform is first rotated into the orientation for dropping bags into the inner row (step 118), and the platform is then driven to the selected inner row position in step 116. This procedure is reversed if the platform is already oriented to drop bags into the inner row, as in FIG. 5C, with the platform being rotated back into the outer row drop orientation of FIG. 5A before proceeding to step 116 if the selected position is in the outer row. Alternatively, the platform may be rotated into the required orientation on arrival at the selected bag drop position.

Figure 10:
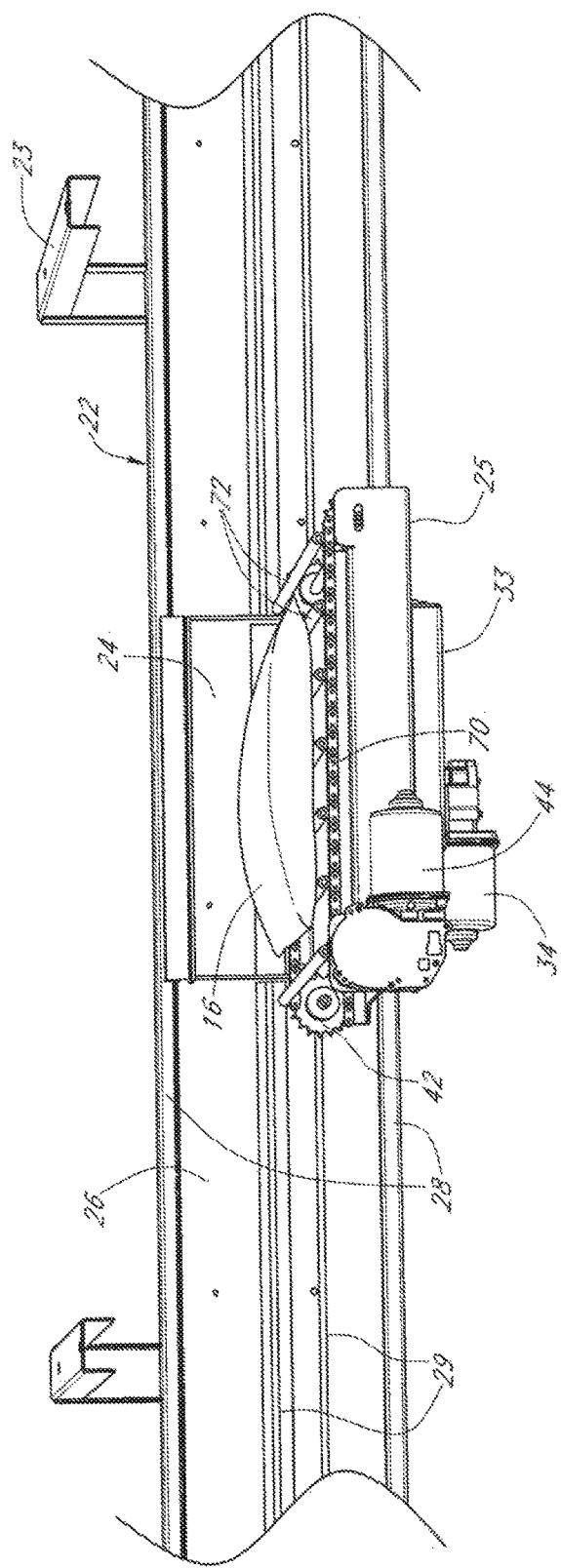
FIG. 10 illustrates the platform transported from the position of FIG. 9 and rotated into the second discharge position of FIG. 5C.

Once the platform is at the selected bag drop position, the platform conveyor drive 44 is actuated to drive the bag off the end of the platform (step 120). If the selected position is in the outer row B, the platform is oriented as in FIG. 5A and the platform conveyor is driven in a first direction to drive the bag off the first end 40 of the platform so that it drops into the selected storage position in row B. If the selected discharge position is in the inner row at step 120, the platform is oriented as illustrated in FIG. 5C and FIG. 10, with both ends 40 and 41 of the platform positioned directly above storage positions in row A. In this case, the platform conveyor drive 44 is actuated in either a first direction or a second, reverse direction to drive the bag off the first end 40 or second end 41 of the platform (depending on the location of the selected discharge position). The platform is then returned to the start position beneath the bag drop opening 18 (step 122).

In an alternative method, the platform may rotated back into the orientation of FIG. 5A either before or after it is driven back to the start position. This may be done when a subsequent bag is to be deposited in the outer row, for example, or may be standard procedure. As noted above, in another alternative method, the platform may be positioned in the inner or outer drop orientation, depending on whether the next bag drop position is in the inner or outer row, on arrival at the bag drop location rather than prior to driving the platform to the bag drop location as illustrated in FIG. 14.

Figure 13A:
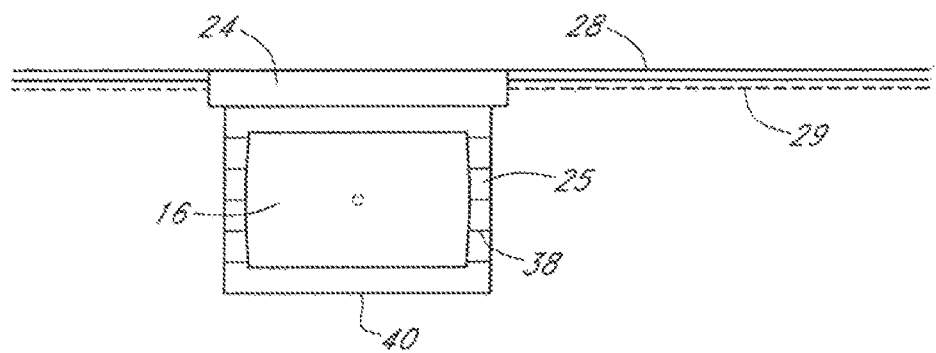
FIGS. 13A to 13C are schematic top plan views of the carriage and the bag support platform at different positions during transport and distribution of bags.
Figure 13B:
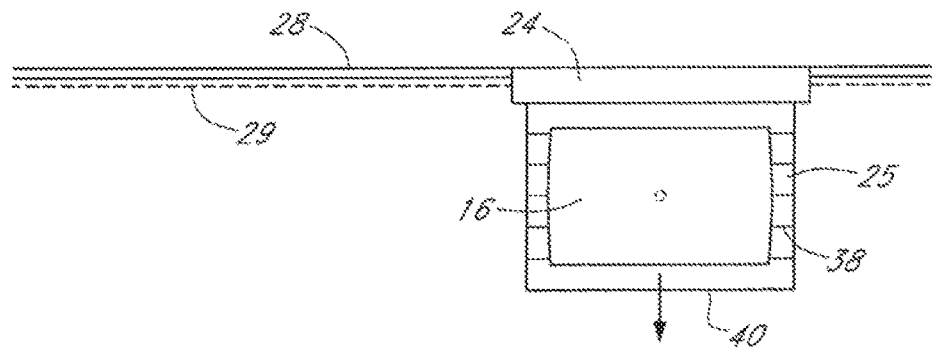
Figure 13C:
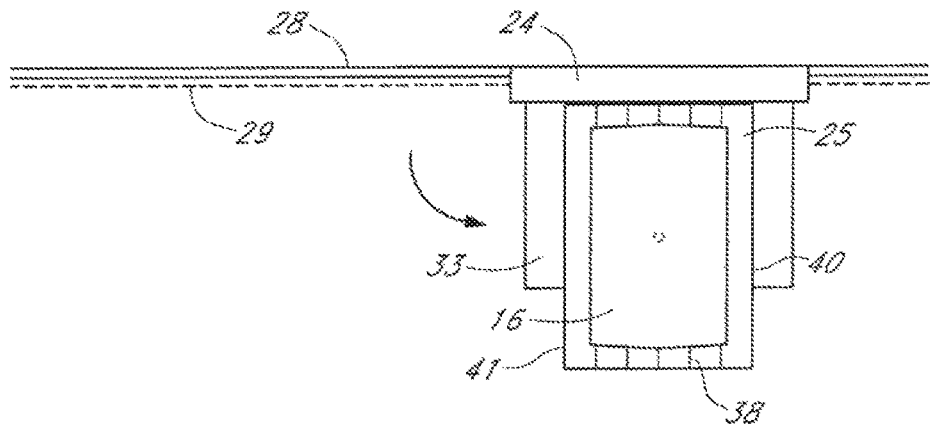
Figure 13D:
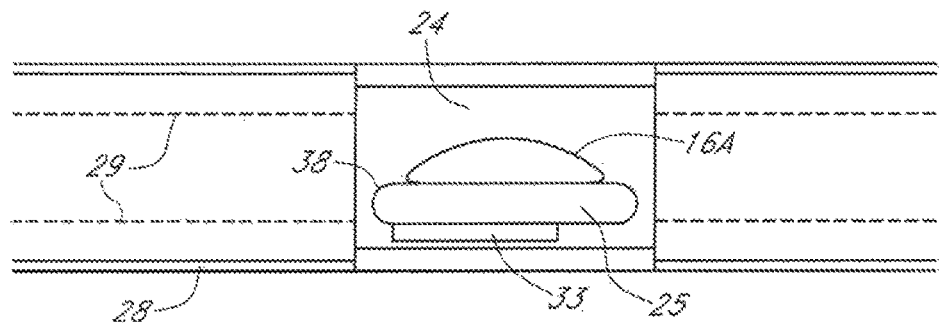
FIGS. 13D to 13F are schematic front elevation views of the carriage and the bag support platform illustrating a bag being discharged from a front end of the platform to fall into a storage position in one of the underlying stacked bag storage rows.
Figure 13E:
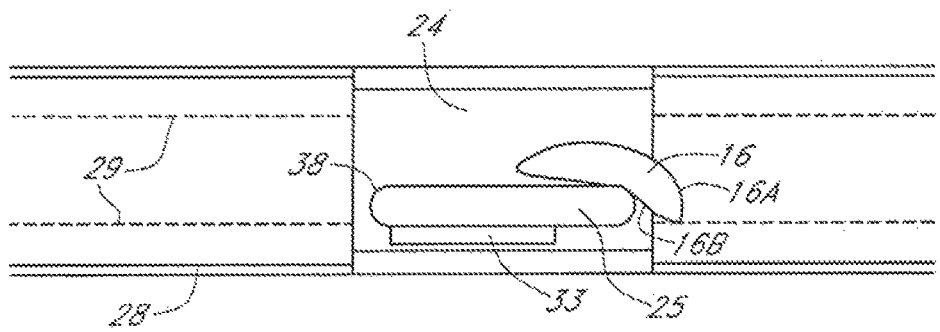
Figure 13F:
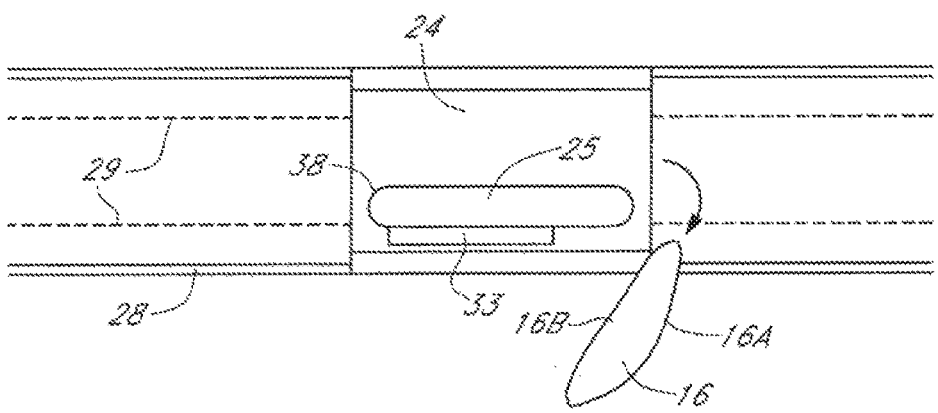

The method of transporting and distributing a bag is also illustrated schematically in the simplified view of the bag transport platform and carriage in FIGS. 13A to 13F. FIG. 13A illustrates a position of platform 25 oriented for distributing bags into the outer row, and in the start position under the bag drop opening 18 with a bag on top of the platform conveyor and shifted into a horizontal orientation with one face 16A of the bag facing upwards. FIG. 13B illustrates a subsequent position when the carriage and platform have been driven away from the position of FIG. 13A and towards as selected bag discharge position. FIG. 13C illustrates the platform in a rotated position for discharging bags into the inner row A. FIGS. 13D to 13F are front elevation views of the platform in the position of FIG. 13C illustrating how a bag on the conveyor 38 is driven off the first end of the platform. As illustrated, the conveyor is configured so that the bag is turned over as it drops off the end of the platform. The bag then falls down on top of a stack of bags in the storage position with the opposite face 16B upwards. In this way, the stacking is controlled such that all bags in each row are stored with the same face of the bag facing upwards. The upward face may be arranged to have the desired label information for a customer considering purchase of the product. In other words, the bag forming and filling station is arranged with the bag film having printed label information on face 16B which faces outwards as the bag is dropped through opening 18. When the platform conveyor is driven rearwards, the bag rotates down into a transport position with face 16A of the bag facing upwards. Thus, when the bag is conveyed off the first end 40 or second end 41 of the platform, the bag turns over and falls to the storage position with the desired face 16B of the bag facing upwards.

FIG. 15 illustrates one possible method for determining a bag drop sequence and selecting a bag drop or discharge position for each new bag received on platform 25. On initial start up (step 124) of machine 10 with the storage compartment 15 empty, i.e. when machine 10 is first installed, a predetermined fill sequence is used to start to fill the compartment with bags of ice. This may be A1, A2, . . . AN, B1, B2, . . . BN as described above, or any other alternative, efficient fill sequence covering all the possible storage positions. The controller 100 controls the various drives of the distributing apparatus to start to fill the compartment according to the predetermined sequence (step 125). At the same time, the current fill levels of the various storage positions are monitored by the controller (step 126), using the outputs of the fill level detector or detectors which scan the various storage positions in each row as the platform is driven back and forth along the length of the rows A,B. Scanning may take place while bags are being carried and distributed, or in separate scanning sequences while the platform is empty, or both.

If all storage positions are full to capacity in rows A and B at step 127, the ice making, collecting, and bag filling units and the distributing apparatus 20 are turned of at step 128. After expiry of a predetermined time period (step 130), or detection of repeated openings of the compartment doors indicating that bags of ice are being removed for purchase, the platform conveyor is activated to drive the platform back and forth to locate any partially filled or low storage positions (step 126). If storage positions with fill capacity are detected at step 127, and the ice making, collecting and bagging units are on (Step 127), the controller operates the distributing apparatus to continue to fill the lowest detected storage positions which have capacity to receive more bags (step 134), and monitoring continues at step 126. If the ice making, collecting, and bagging units are off or inactive at step 127, they are turned back on (step 135) to supply filled bags to the distributing apparatus, and the controller proceeds to control the distributing apparatus to distribute bags to the storage positions detected to have fill capacity at step 134.

Although the support platform in the foregoing embodiment is rotated between first and second orientations to deliver bags or articles into first and second side-by-side rows of storage positions, alternative embodiments may comprise non-rotational movement of the platform between first and second spaced horizontal delivery positions relative to the carriage, where the platform may be in the same orientation in both delivery positions. For example, the platform oriented as in FIG. 5C may be driven linearly in a direction transverse to conveyor back plate 22 from the position in FIG. 5C to an outwardly spaced position over the second row B, with the support arm 33 extended and acting as a track for the linear movement between the two platform positions. A further extension of arm 33 may allow for more than two rows of stacked bags or articles in other embodiments where increased storage compartment size and storage capacity is desired.

The method and apparatus described above allows bags filled with ice or other serially produced articles to be successively delivered to storage positions in two side-by-side rows of storage positions. Rather than being randomly and inefficiently stacked in a single pile forming a pyramid, the bags are relatively evenly distributed in separate stacks across the entire storage area, increasing storage capacity. In alternative embodiments, only one storage row may be provided with only one orientation of the storage platform to dispense bags off opposite ends of the platform into storage positions in the single row, or a greater number of storage rows may be provided with more alternative orientations of the conveyor platform 25 to dispense into different rows. Rows with six storage positions are shown by way of example in FIG. 11, but a greater or lesser number of storage positions may be provided in alternative embodiments, depending on the size of the bag or article to be distributed, as well as the dimensions of the storage compartment 15. In the illustrated embodiment, the distributing apparatus 20 is controlled and the support platform 25 is designed so that bags are oriented horizontally on the conveyor platform 25 with a first face facing upwards as the platform is driven to a drop off position. The platform conveyor and rounded ends are designed so that bags tend to rotate as they are rolled off the platform, flipping or turning over and dropping into an underlying pile of bags with a second face facing upwards. The arrangement is such that bags tend to always flip through one half revolution as they fall off the platform, and land in the same orientation on top of each stack, regardless of the stack height. This helps to maintain even stacking of bags in adjacent stacks or piles along the length of each row, while allowing a desired face of the bag with consumer information to face upwards to provide information to consumers considering purchase.

The article distribution apparatus and method described above organizes products in substantially uniform stacks so that it is relatively easy for customers to pick up a product such as a bag of ice. This also increases storage capacity by 50%, and reduces labor costs previously incurred when personnel had to manually level uneven stacks of bagged ice. The degree of filling of the compartment can be remotely monitored with the monitoring used to control both ice making and bag distribution. This allows quicker start up and more efficient utilization of the ice making units, which can be turned off when monitoring indicates that the storage compartment is completely full, and re-started as soon as the level of stacked bags is detected to be uneven or low.

The article distribution method and apparatus is described above in connection with an ice machine in which ice chunks or cubes are made, collected, directed into partially formed bags at a bag making and filling station, and the bagged ice is then dropped onto the distribution apparatus for distribution into a storage compartment to form substantially uniform and even stacks of bagged ice. However, the apparatus and method may also be used in other applications where a large number of articles are produced centrally above a storage compartment in which the articles are to be evenly distributed, in order to utilize the capacity of the storage compartment. Examples of such applications are plastic injection molding machines where a large number of articles are produced centrally, or in connection with packing and supplying other types of articles or foods in bags or other containers, e.g. vegetables, snack foods, confectionary, office supplies, electronic components, or the like. For non-food articles, the storage compartment may not need to be temperature controlled. In each case, the articles may be dispensed into a storage compartment at a store which also acts as a merchandiser for the articles, or in a storage facility where the articles may be later packaged and shipped.

Those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine and the processing can be performed on a single piece of hardware or distributed across multiple servers or running on multiple computers that are housed in a local area or dispersed across different geographic locations. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. An apparatus for distributing a series of articles at different storage positions in a storage compartment, comprising:
   a horizontal guide rail;
   a carriage movably mounted on the guide rail;
   a horizontal conveyor which is configured to drive the carriage back and forth in a horizontal direction along the guide rail;
   an article support platform movably mounted on the carriage and configured for movement between at least first and second horizontal article dispensing positions relative to the carriage, the platform configured to receive successive articles from a supply of articles when positioned in a start position to receive articles from a serial article supply;
   a platform drive associated with the platform and configured to move the platform between the first and second article dispensing positions;
   an article distributor on the article support platform which is configured to drive articles off the platform into storage positions in a first row when the platform is in the first article dispensing position and into storage positions in a second row when the platform is in the second article dispensing position; and
   a controller associated with the horizontal conveyor, platform drive, and article distributor which is configured to control the horizontal conveyor and platform drive to drive the platform to a location above a selected storage position in the first or second row, and to control the article distributor to drive the article off the platform to drop into the selected storage position.

2. The apparatus of claim 1, further comprising at least one detector connected to the controller and configured to detect a fill level at each storage position when the carriage is driven along the guide rail over a storage area.

3. The apparatus of claim 2, wherein the carriage has a horizontal support arm and the article support platform is movably mounted on the support arm for movement between the first and second article dispensing positions.

4. The apparatus of claim 3, wherein the support arm has a lower face and first and second detectors mounted on the lower face and configured to detect fill levels in the first and second storage rows beneath the apparatus, the detectors having outputs connected to the controller.

5. The apparatus of claim 1, wherein the article support platform is rotatably mounted for rotation between first and second orientations relative to the carriage which correspond to the first and second article dispensing positions, respectively, and the platform drive is configured to rotate the platform between the first and second orientations.

6. The apparatus of claim 5, wherein the second platform orientation is perpendicular to the first platform orientation.

7. The apparatus of claim 1, wherein the article distributor comprises an endless conveyor belt configured to support articles received on the platform and a conveyor belt drive configured to drive the conveyor belt in at least a first direction to convey articles off the platform.

8. The apparatus of claim 7, wherein the platform has opposite first and second ends and the conveyor belt extends between the first and second ends of the platform.

9. The apparatus of claim 8, wherein the conveyor belt drive is configured to drive the conveyor belt in first and second opposite directions to drive articles selectively off the first and second ends of the platform, and the first and second ends of the platform are configured for location above different storage positions in the first row when the platform is in the first orientation.

10. The apparatus of claim 8, further comprising rollers at opposite ends of the platform about which the endless conveyor belt extends, whereby portions of the conveyor belt extending over the rollers define the opposite first and second convex, rounded ends of the platform, and the conveyor belt is configured to rotate articles on the belt as they are driven off the belt, whereby each article flips over as it falls off the conveyor onto a stack of articles in a storage position.

11. A bagged ice storage and dispensing system, comprising:
 a temperature controlled storage unit having an internal storage area, an upper wall, a lower wall, a front wall, a rear wall, and opposite ends, at least one door in the front wall allowing access to the storage area;
 the lower wall of the storage unit defining at least a first row of adjacent storage positions configured to support stacked bags of ice;
 an opening in the upper wall communicating with a bagged ice supplier and configured to receive successive bags of ice for distribution into the storage unit;
 a bag distributing unit secured in an upper portion of the storage unit and extending horizontally above the first row of storage positions, the distributing unit comprising a horizontal rail extending parallel to the first row, a carriage movably mounted on the horizontal rail, a horizontal drive configured to drive the carriage back and forth in a horizontal path along the rail, a horizontal support platform mounted on the carriage, the platform having a conveyor configured to support a bag of ice on the platform and a conveyor drive associated with the conveyor which is configured to drive the conveyor in at least a first direction to convey a bag off the platform and drop the bag into an underlying storage position; and
 a controller associated with the bag distributing unit and configured to control the horizontal drive and conveyor drive to drive the support platform to selected positions in the horizontal path and to actuate the conveyor drive at each selected position to convey a bag off the platform and into the underlying storage position;
 wherein the lower wall of the storage unit defines first and second side-by-side rows of stacked bag storage positions, and the support platform is movably mounted on the carriage, the system further comprising a platform drive configured to move the platform between a first position for distributing bags into the first row and a second position for distributing bags into the second row, the controller being configured to control the platform drive to move the platform back and forth between the first and second positions for distribution of bags into the first and second rows, respectively; and
 wherein the support platform is rotatably mounted on the carriage and the platform drive comprises a rotational drive configured to rotate the platform between first and second orientations corresponding to the first and second distributing positions, respectively.

12. A bagged ice storage and dispensing system, comprising:
 a temperature controlled storage unit having an internal storage area, an upper wall, a lower wall, a front wall, a rear wall, and opposite ends, at least one door in the front wall allowing access to the storage area;
 the lower wall of the storage unit defining at least a first row of adjacent storage positions configured to support stacked bags of ice;
 an opening in the upper wall communicating with a bagged ice supplier and configured to receive successive bags of ice for distribution into the storage unit;
 a bag distributing unit secured in an upper portion of the storage unit and extending horizontally above the first row of storage positions, the distributing unit comprising a horizontal rail extending parallel to the first row, a carriage movably mounted on the horizontal rail, a horizontal drive configured to drive the carriage back and forth in a horizontal path along the rail, a horizontal support platform mounted on the carriage, the platform having a conveyor configured to support a bag of ice on the platform and a conveyor drive associated with the conveyor which is configured to drive the conveyor in at least a first direction to convey a bag off the platform and drop the bag into an underlying storage position; and
 a controller associated with the bag distributing unit and configured to control the horizontal drive and conveyor drive to drive the support platform to selected positions in the horizontal path and to actuate the conveyor drive at each selected position to convey a bag off the platform and into the underlying storage position;
 wherein the conveyor drive is reversible and the platform is configured for distribution of bags off opposite ends of the platform into underlying storage positions in the first row.

13. A bagged ice storage and dispensing system, comprising:
 a temperature controlled storage unit having an internal storage area, an upper wall, a lower wall, a front wall, a rear wall, and opposite ends, at least one door in the front wall allowing access to the storage area;
 the lower wall of the storage unit defining at least a first row of adjacent storage positions configured to support stacked bags of ice;
 an opening in the upper wall communicating with a bagged ice supplier and configured to receive successive bags of ice for distribution into the storage unit;
 a bag distributing unit secured in an upper portion of the storage unit and extending horizontally above the first row of storage positions, the distributing unit comprising a horizontal rail extending parallel to the first row, a carriage movably mounted on the horizontal rail, a horizontal drive configured to drive the carriage back and forth in a horizontal path along the rail, a horizontal support platform mounted on the carriage, the platform having a conveyor configured to support a bag of ice on the platform and a conveyor drive associated with the conveyor which is configured to drive the conveyor in at least a first direction to convey a bag off the platform and drop the bag into an underlying storage position;
 a controller associated with the bag distributing unit and configured to control the horizontal drive and conveyor drive to drive the support platform to selected positions in the horizontal path and to actuate the conveyor drive at each selected position to convey a bag off the platform and into the underlying storage position; and at least one detector configured to detect fill levels at the respective storage positions and provide current fill level outputs to the controller, the controller including a fill level detection module configured to determine whether all storage positions are full to capacity and a distribution control module which controls the bag distribution unit to stop delivery of bags of ice into the storage unit when all storage positions are full and controls the bag distribution unit to deliver bags to storage positions which are not full when the storage unit is not full to capacity.

14. The system of claim 13, wherein the storage unit has at least one detector which detects opening of the door and provides a door open detection signal to the controller when the door is open, the distribution control module being configured to control the bag distribution unit to stop delivery of bags of ice into the storage area when the door is open and to re-start delivery of bags of ice when the door is re-closed.

15. The system of claim 13, wherein the controller further comprises a bagged ice delivery control module which is configured to stop delivery of bags of ice to the bag distribution unit when all storage positions are full, and to re-start delivery of bags of ice to the bag distribution unit when at least some storage positions are no longer full.

16. The system of claim 15, wherein the controller is configured to increase the speed of delivery of bags of ice to the bag distribution unit when storage capacity in the storage area reaches a predetermined level.

17. A bagged ice storage and dispensing system, comprising:

a temperature controlled storage unit having an internal storage area, an upper wall, a lower wall, a front wall, a rear wall, and opposite ends, at least one door in the front wall allowing access to the storage area;

the lower wall of the storage unit defining at least a first row of adjacent storage positions configured to support stacked bags of ice;

an opening in the upper wall communicating with a bagged ice supplier and configured to receive successive bags of ice for distribution into the storage unit;

a bag distributing unit secured in an upper portion of the storage unit and extending horizontally above the first row of storage positions, the distributing unit comprising a horizontal rail extending parallel to the first row, a carriage movably mounted on the horizontal rail, a horizontal drive configured to drive the carriage back and forth in a horizontal path along the rail, a horizontal support platform mounted on the carriage, the platform having a conveyor configured to support a bag of ice on the platform and a conveyor drive associated with the conveyor which is configured to drive the conveyor in at least a first direction to convey a bag off the platform and drop the bag into an underlying storage position; and a controller associated with the bag distributing unit and configured to control the horizontal drive and conveyor drive to drive the support platform to selected positions in the horizontal path and to actuate the conveyor drive at each selected position to convey a bag off the platform and into the underlying storage position;

wherein the lower wall of the storage unit defines first and second side-by-side rows of stacked bag storage positions, and the support platform is movably mounted on the carriage, the system further comprising a platform drive configured to move the platform between a first position for distributing bags into the first row and a second position for distributing bags into the second row, the controller being configured to control the platform drive to move the platform back and forth between the first and second positions for distribution of bags into the first and second rows, respectively; and wherein the carriage has a support arm extending transverse to the first and second rows and the platform is movably mounted on the support arm, the support arm having a lower wall facing the lower wall of the storage unit, and first and second detectors are positioned on the lower wall and configured to detect bag fill levels in the storage positions in the first and second rows, respectively, the detectors having outputs connected to the controller.

18. A bagged ice dispensing machine, comprising:

a temperature controlled storage compartment having an internal storage area having at least first row of bagged ice storage positions for storing adjacent stacks of bags containing ice, the storage compartment having an upper wall with an opening for receiving bags of ice into the storage compartment;

a bag distributing unit secured in an upper portion of the storage unit and extending horizontally above the first row of storage positions, the distributing unit comprising a horizontal rail extending parallel to the first row, a carriage movably mounted on the horizontal rail, a horizontal support platform mounted on the carriage, a horizontal drive configured to drive the carriage back and forth in a horizontal path along the rail from a start position in which the platform is located under the opening in the upper wall, the platform having a conveyor configured to support a bag of ice on the platform and a conveyor drive associated with the conveyor which is configured to drive the conveyor in at least a first direction to convey a bag off the platform and drop the bag into an underlying storage position;

an ice bagging unit mounted above the storage compartment and having a bagged ice outlet communicating with the opening in the upper wall of the storage compartment and at least one ice receiving inlet at an upper end of the ice collecting and bagging unit, the ice collecting and bagging unit configured to collect ice from the ice receiving inlet, supply a predetermined amount of ice to successive bags, and supply bags of ice to the bagged ice outlet;

an ice making unit mounted above the ice collecting and bagging unit and having an ice outlet communicating with the ice receiving inlet; and a controller associated with ice making unit, ice bagging unit, and bag distributing unit which has an ice making and bagging control module configured to control the ice making and bagging units based on detected storage capacity in the storage compartment, and a bag distribution control module which controls the bag distributing unit to distribute bags to selected unfilled storage positions in the storage compartment.

19. The machine of claim 18, wherein the storage compartment has first and second side-by-side rows of bagged ice storage positions beneath the bag distributing unit, and the support platform is configured to selectively distribute bags into the first and second rows of storage positions.

20. The machine of claim 19, further comprising at least first and second detectors linked to the controller and positioned to detect the fill levels at storage positions in the first and second row, respectively, the controller configured to monitor the detector outputs to detect fill levels at the storage positions and to control the bag distributing unit to distribute bags to selected unfilled storage positions in the first and second rows.

\* \* \* \* \*